United States Patent
Yang

(10) Patent No.: US 9,325,186 B2
(45) Date of Patent: Apr. 26, 2016

(54) CHARGING AREA DISPLAYABLE WIRELESS CHARGER AND CONTROLLING METHOD THEREOF

(71) Applicant: LG ELECTRONICS INC., Seoul (KR)

(72) Inventor: Buyoung Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 13/889,385

(22) Filed: May 8, 2013

(65) Prior Publication Data
US 2013/0300356 A1    Nov. 14, 2013

(30) Foreign Application Priority Data
May 14, 2012 (KR) .......................... 10-2012-0050745

(51) Int. Cl.
  H02J 7/00    (2006.01)
  H02J 7/02    (2006.01)
  H02J 17/00   (2006.01)

(52) U.S. Cl.
  CPC .............. *H02J 7/0047* (2013.01); *H02J 7/025* (2013.01); *H02J 17/00* (2013.01)

(58) Field of Classification Search
  CPC ................................ H02J 7/025; H02J 7/0047
  USPC ........................................................ 320/108
  See application file for complete search history.

(56) References Cited

U.S. PATENT DOCUMENTS

| | | | |
|---|---|---|---|
| 2009/0096414 A1* | 4/2009 | Cheng et al. .................. | 320/108 |
| 2009/0156268 A1* | 6/2009 | Kim et al. ..................... | 455/573 |
| 2010/0081378 A1* | 4/2010 | Kawamura ..................... | 455/41.1 |
| 2011/0074344 A1* | 3/2011 | Park et al. ..................... | 320/108 |
| 2013/0257363 A1* | 10/2013 | Lota et al. ..................... | 320/108 |

* cited by examiner

*Primary Examiner* — Richard Isla Rodas
*Assistant Examiner* — David V Henze-Gongola
(74) *Attorney, Agent, or Firm* — Birch, Stewart, Kolasch & Birch, LLP

(57) ABSTRACT

A wireless charger and controlling method thereof are disclosed, by which a charging area can be displayed in further consideration of user's convenience. The present invention includes a power supply unit configured to supply a power by wireless to a power receiver located in a charging area within a predetermined distance, a light projection unit configured to project a light on an area around the wireless charger, and a control unit configured to control the light projection unit to project the light on the area around the wireless charger to visually discriminate the charging area.

11 Claims, 22 Drawing Sheets

FIG. 4
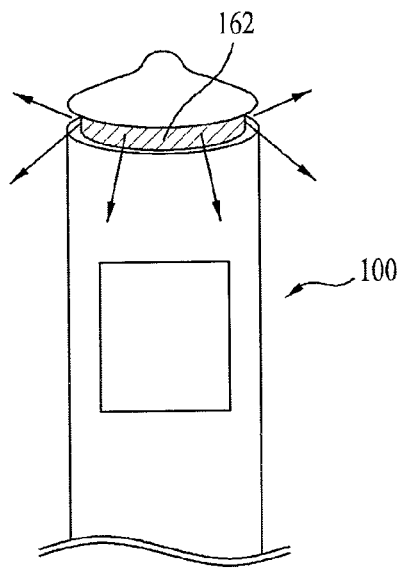
(a)
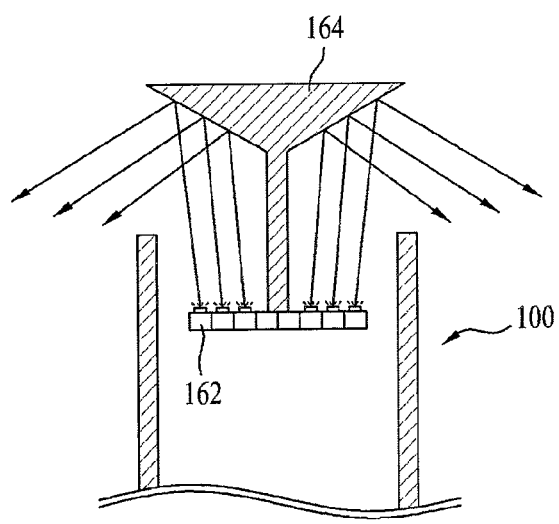
(b)

FIG. 18
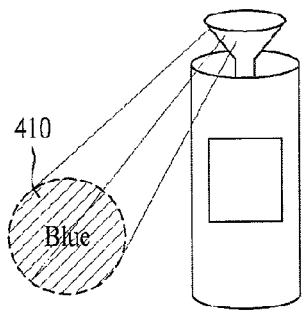
(a)
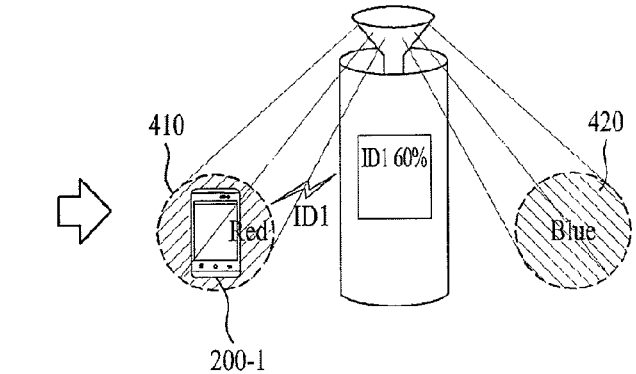
(b)
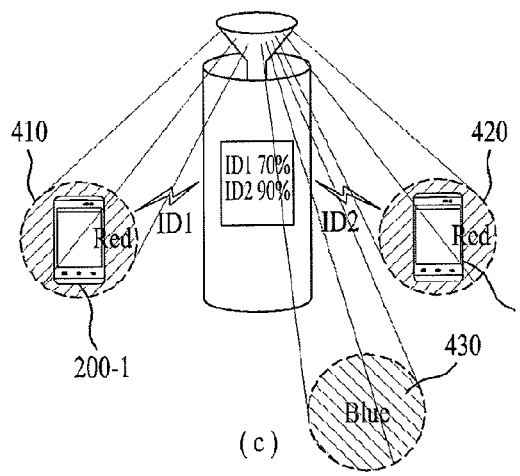
(c)
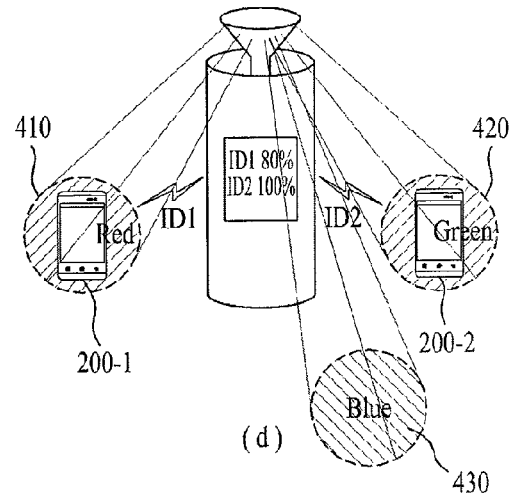
(d)

FIG. 19
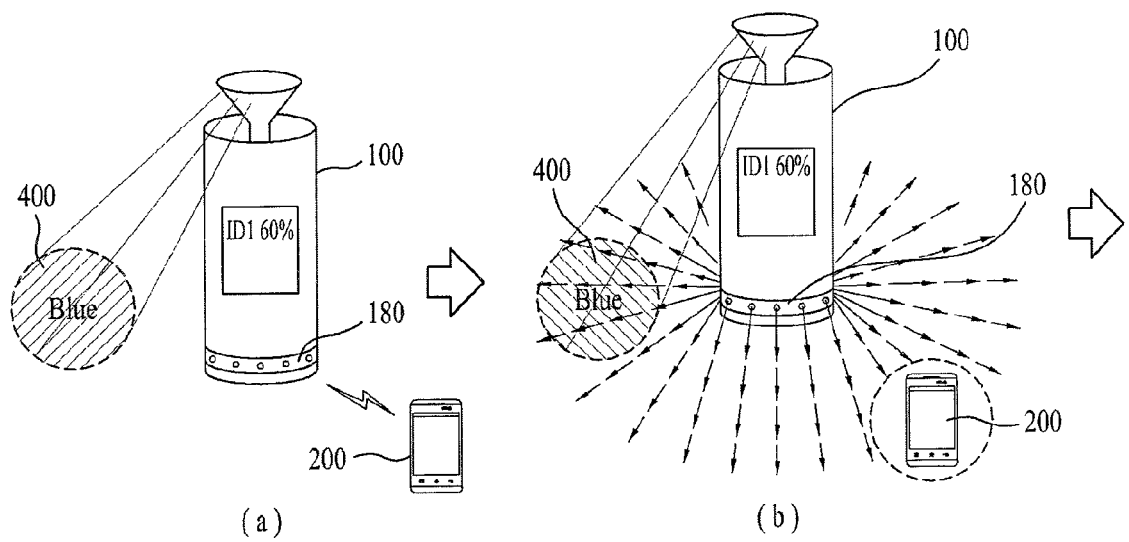
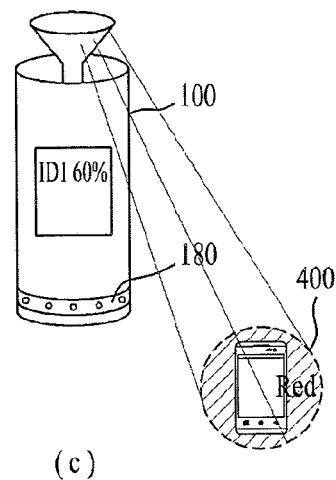

FIG. 20
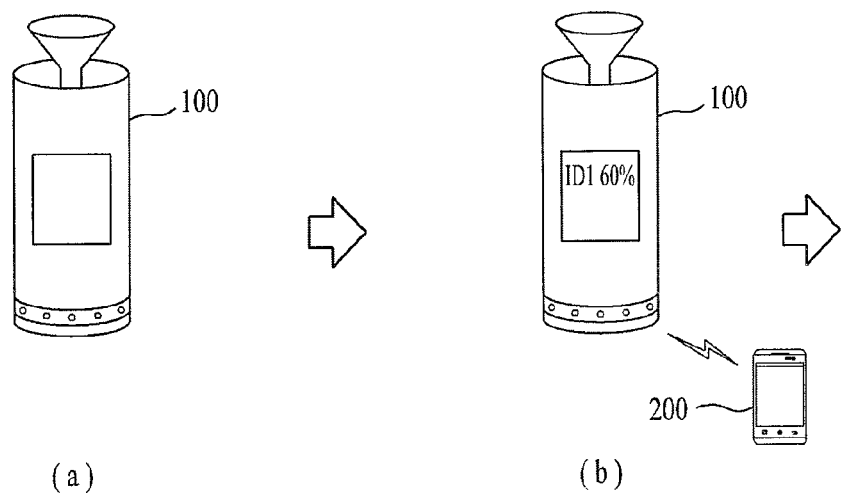
(a)   (b)
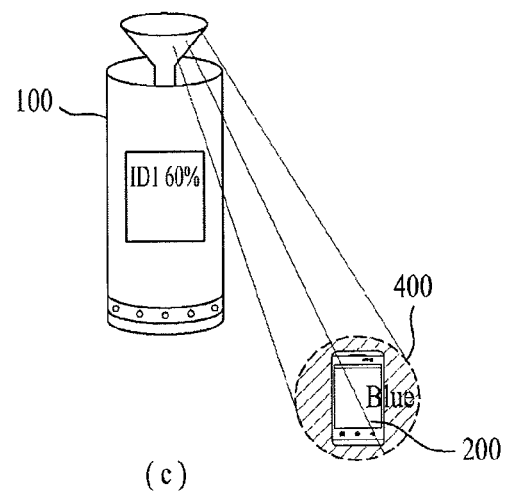
(c)

CHARGING AREA DISPLAYABLE WIRELESS CHARGER AND CONTROLLING METHOD THEREOF

Pursuant to 35 U.S.C. §119(a), this application claims the benefit of the Korean Patent Application No. 10-2012-0050745, filed on May 14, 2012, which is hereby incorporated by reference as if fully set forth herein.

BACKGROUND OF THE INVENTION

1. Field of the Invention

The present invention relates to a charger and controlling method thereof, and more particularly, to a wireless charger and controlling method thereof. Although the present invention is suitable for a wide scope of applications, it is particularly suitable for displaying a charging area in further consideration of user's convenience.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or video, game play, broadcast reception and the like for example.

A battery is necessary to operate the above-mentioned mobile terminal. A durable time of the mobile terminal depends not on a power line but on a battery power unlike a stationary terminal (e.g., a fixed type terminal).

Recently, for the convenience in using a mobile terminal, most of mobile terminals have chargeable batteries. In order to charge a battery of a mobile terminal according to a related art, a terminal supply system is used in a manner of connecting a cable to a charger terminal. In particular, the terminal supply system is a wired charging system that enables a battery to be charged by applying an AC power to a charger terminal.

If a power is supplied by the terminal supply system, particles cumulate in a battery due to a potential difference between a charger and the battery to cause the following problems. First of all, the particles cumulatively stacked in the battery degrade performance and life span of the battery and may cause a fire.

To overcome the above problems, many ongoing efforts are made to research and develop a contactless charger. Electromagnetic induction system has been introduced to commercialize the contactless charger in the early days. According to the electromagnetic indication system, a battery is charged based on the electromagnetic induction effect of coils provided to a charger and a mobile terminal. Yet, the contactless charger of the electromagnetic induction type has the following problems. First of all, a transmission distance for supplying a power by wireless is short. Secondly, the coil of the charger and the coil of the mobile terminal should be juxtaposed with each other.

To overcome the above problems, there are many ongoing discussions on a contactless charger of a magnetic resonance system. Compared to the electromagnetic induction contactless charter, the magnetic resonance contactless charger is advantageous in having a longer wireless charging distance and a high degree of freedom of transceiving coil placement.

However, according to the magnetic resonance system, there is no method of providing a user with information indicating a specific wireless chargeable range. The contactless charger using electromagnetic induction effect is developed into a pad configuration. If a mobile terminal is placed on a pad of the contactless charger, it is able to expect that the mobile terminal will be charged. On the other hand, it is not necessary for the magnetic resonance contactless charger to be developed into the pad configuration. If the magnetic resonance contactless charger does not have the pad configuration, it may cause a problem that a user has not idea about a place on which the mobile terminal should be placed to be charged.

SUMMARY OF THE INVENTION

Accordingly, the present invention is directed to a charger and controlling method thereof that substantially obviate one or more problems due to limitations and disadvantages of the related art.

An object of the present invention is to provide a wireless charger and controlling method thereof, by which a charging area of the wireless charger for supplying a charging power by wireless can be displayed.

Another object of the present invention is to provide a wireless charger and controlling method thereof, by which a charged state of a power receiver (e.g., a mobile terminal) supplied with a power by wireless from the wireless charger can be displayed in brief.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wireless charger according to the present invention may include a power supply unit configured to supply a power by wireless to a power receiver located in a charging area within a predetermined distance, a light projection unit configured to project a light on an area around the wireless charger, and a control unit configured to control the light projection unit to project the light on the area around the wireless charger to visually discriminate the charging area.

Preferably, if a first power receiver capable of being supplied with the power by wireless from the wireless charger is detected, the control unit may control the light projection unit to change a color of the charging area into a second color from a first color.

More preferably, if the first power receiver is fully charged, the control unit may control the light projection unit to change the color of the charging area from the second color into a third color.

In another aspect of the present invention, a wireless charger according to the present invention may include a power supply unit configured to supply a power by wireless to a power receiver located in a charging area within a predetermined distance, a light projection unit configured to project a light on an area around the wireless charger, a communication unit configured to receive a charged state information from the power receiver, and a control unit configured to control the light projection unit to display a first subarea indicating a charged state of the power receiver on the area around the wireless charger.

In a further aspect of the present invention, a method of controlling a wireless charger according to the present invention may include the steps of displaying a charging area on an area around the wireless charger to indicate a charging possible rage of the wireless charger, detecting a power receiver configured to be provided with a charging power by wireless from the wireless charger, and if the power receiver is detected, changing a color of the charging area into a second color from a first color.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for one example to show that a light projection unit is configured to use direct projection or indirect projection;

FIG. 18 is a diagram for one example to describe a process for creating a plurality of subcells and a process for changing a color of each of the subcells from a first color into a second color;

FIG. 19 is a diagram for one example to describe that a subcell moves to a location from which a wireless charger is detected;

FIG. 20 is a diagram for one example to describe that a subcell is created after a wireless charger has been detected;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

Figure 1:
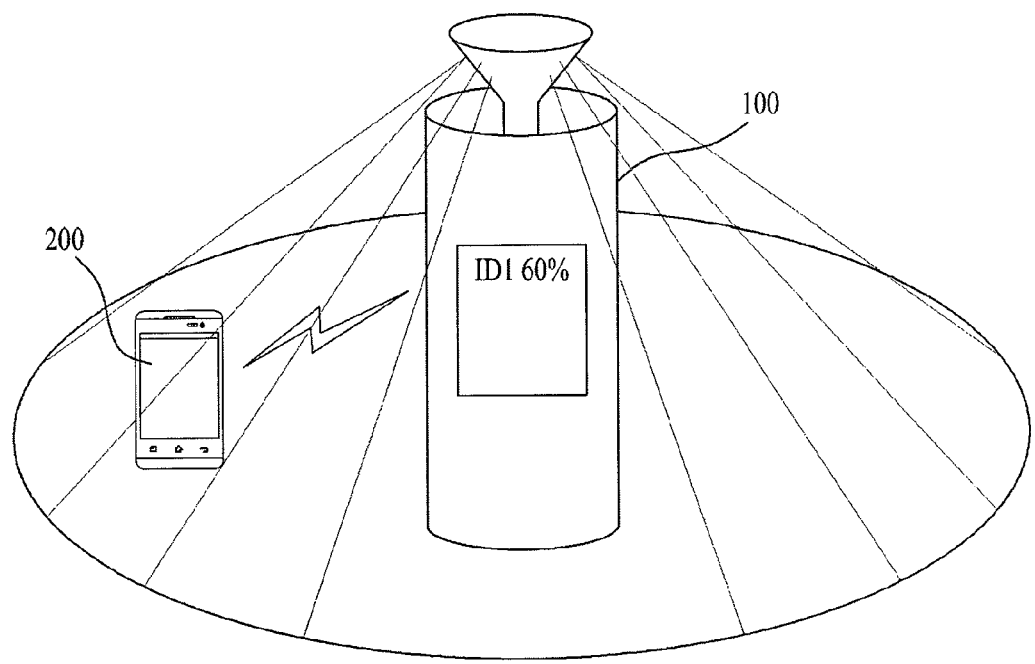
FIG. 1 is a schematic diagram of a wireless charging system according to the present invention.

FIG. 1 is a schematic diagram of a wireless charging system according to the present invention.

Referring to FIG. 1, a wireless charging system according to the present invention may include a wireless charger 100 and a power receiver 200 configured to charge a battery 260 by being supplied with a power from the wireless charger 100 without contact in-between.

The wireless charger 100 is a device configured to generate a charging power to supply to the power receiver 200 in a manner of being supplied with electric energy from an external power source. Unlike a pad type charger 100, it is unnecessary to juxtapose the power receiver 200 on a pad. If the power receiver 200 is situated within a prescribed distance from the wireless charger 100, it is able to supply the charging power to the power receiver 200.

The power receiver 200 is a device configured to charge the battery 260 by being supplied with the charging power from the wireless charger 100. In particular, the power receiver 200 may include a mobile terminal having the battery 260 built therein or a battery pack having the battery 260 built therein.

The battery pack conceptionally includes a portable charger configured to charge the battery 260 of the mobile terminal by being connected to the mobile terminal. And, the battery pack may be used for the usage of an auxiliary battery of the mobile terminal.

The mobile terminal 260 having the battery 260 built therein may include one of a mobile phone, a smart phone, a PDA, a laptop computer, a PMP, a navigation system, an MP3 player and the like for example. Besides the above-enumerated mobile terminals, it may be able to design various kinds of terminals, each of which has the battery 260 built therein, to charge the battery 260 by being supplied with a charging power from the wireless charger 100.

The battery 260 provided to the mobile terminal or the battery pack may include such a rechargeable battery (e.g., a secondary battery) as a lithium ion battery, a lithium polymer battery, a nickel cadmium battery, by which the battery 260 may be non-limited.

The wireless charger 100 and the power receiver 200 may include a first resonance unit 110 and a second resonance unit 210, respectively. The wireless charger 100 adjusts a frequency radiating from the first resonance unit 110 to match a resonance frequency of the second resonance unit 210, thereby enabling the power receiver 200 to charge the battery 260 in high efficiency. In particular, it is able to transmit power by wireless through a short-range magnetic field, which is formed if the first resonance unit 110 and the second resonance unit 210 resonate at the same frequency.

Figure 2:
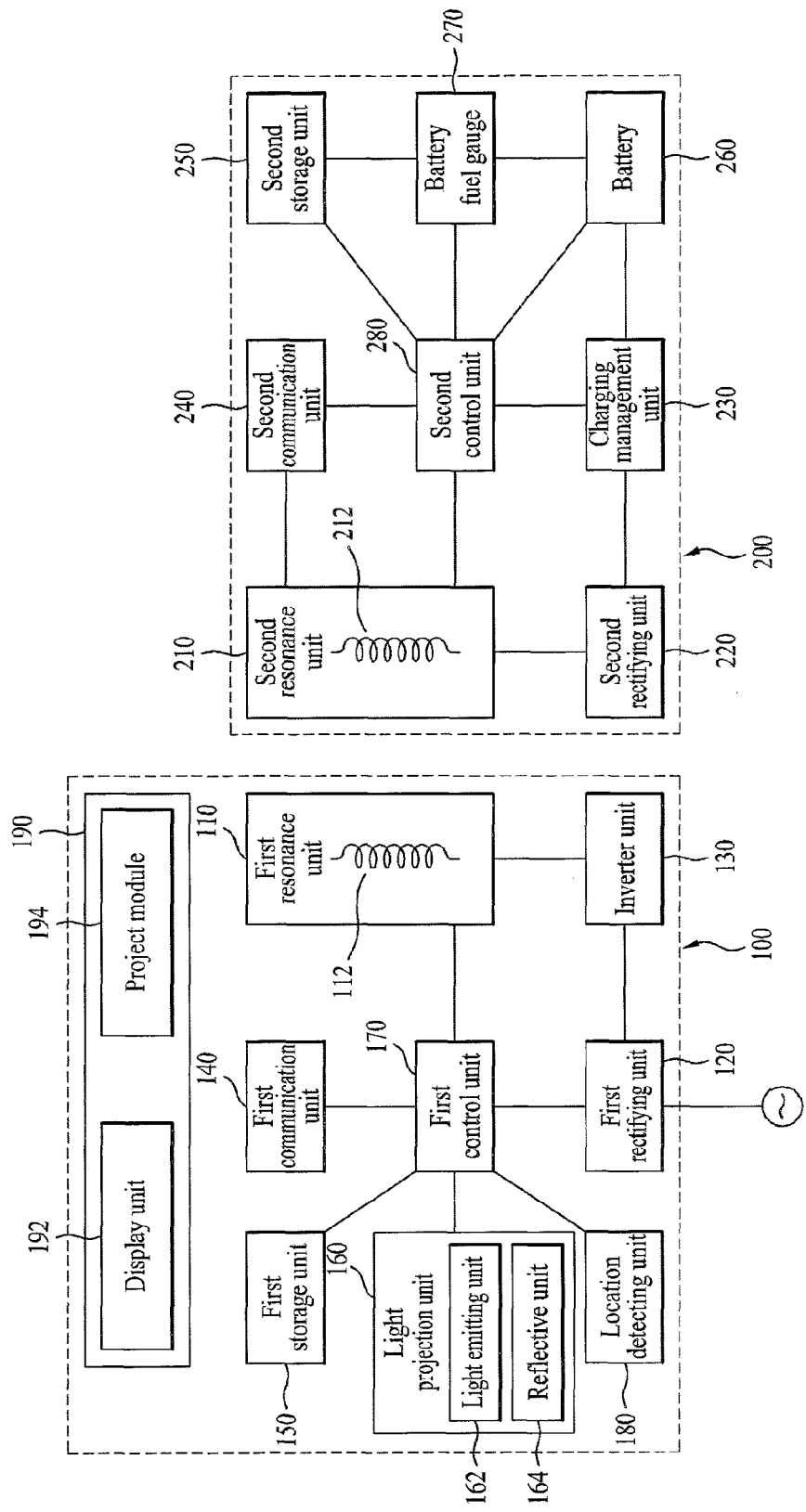
FIG. 2 is a block diagram of a wireless charger and a power receiver shown in FIG. 1.

FIG. 2 is a block diagram of a wireless charger and a power receiver shown in FIG. 1. In the following description, regarding the wireless charger 100 and the power receiver 200 shown in FIG. 2, the configuration of the wireless charger 100 is described and the configuration of the power receiver 200 is then described. For clarity of the following description, 'first-first' and 'secondsecond' shall be prefixed to the components having the same name in the configurations of the wireless charger 100 and the power receiver 200, respectively.

Referring to FIG. 2, the wireless charger 100 may include a first resonance unit 110, a first rectifying unit 120, an inverter unit 130, a first communication unit 140, a first storage unit 150, a light projection unit 160 and a first control unit 170. If necessary, the wireless charger 100 may further include a location detecting unit 180 configured to detect a location of the power receiver 200 and an image output unit 190 configured to output a charged state of the power receiver 200 as an image. The location detecting unit 180 and the image output unit 190 shall be explained in detail in the description of the following embodiment.

In particular, the first resonance unit 110 of the wireless charger 100 may include a first coil 112 configured to perform a magnetic field communication with the power receiver 200 and a wireless power transmission to the power receiver 200. In more particular, the first resonance unit 110 is able to supply a power by wireless to the power receiver located within a charging area determined as a predetermined spaced distance from the first resonance unit 110. In this case, the first coil may be implemented with a solid coil having a plurality of coils aggregated therein. As the first coil 112 is implemented to have the formation of the solid coil, a magnetic field generated from the first coil 112 may have omni-directionality (i.e., no directionality). Therefore, the charging power can be provided to the power receiver 200 irrespective of the direction of the power receiver 200. The first resonance unit 110 is provided to supply the power by wireless to the power receiver 200 and may be named 'power supply unit'.

The first rectifying unit 120 rectifies an AC voltage provided from an AC power line into a DC voltage. In this case, the voltage and frequency of the AC power line may set different per country in which the wireless charger 100 will be used. For instance, an AC power line applied to a rectifier may have 60 Hz & 220 V or 60 Hz & 110 V.

The DC voltage outputted from the first rectifying unit 120 may be applied to the inverter unit 130. The inverter unit 130 inverts a DC voltage on a prescribed level outputted via the first rectifying unit 120 to an AC voltage and then applies the AC voltage to the first resonance unit 110. In particular, the inverter unit 130 is able to output an AC current having the same frequency of the resonance frequency of the power receiver 200 to enable the first resonance unit 110 to oscillate the resonance frequency of the power receiver 200. The AV voltage outputted via the inverter unit 130 is applied to the first resonance unit 110 to activate the first resonance unit 110.

The first communication unit 140 plays a role in demodulating feedback data delivered from the power receiver 200 via the magnetic field communication using the first coil 112 and a role in modulating data inputted from the first control unit 170. Based on the data demodulated by the first communication unit, the first control unit 170 acquires information on a location and/or status of the power receiver 200 and then saves the acquired information in the first storage unit 150.

Meanwhile, the communication between the first communication unit 140 and the power receiver 200 may be performed using WPC (wireless power consortium) communication protocol. In this case, backscatter modulation is applicable between the first communication unit 140 and the power receiver 200. Yet, it is not mandatory to apply the WPC communication protocol between the first communication unit 140 and the power receiver 200. For instance, it is a matter of course that such a standardized communication protocol as NFC, Bluetooth, infrared-ray, Zigbee and the like may be applied between the first communication unit 140 and the power receiver 200.

The light projection unit 160 may display a charging area for charging the power receiver 200 around the wireless charger 100, and more particularly, around the first resonance unit 110, and may display a charged state of the power receiver 200 in the course of wireless charging. In particular, if an AC power line voltage is applied to the wireless charger 100, the first control unit 170 may control the light projection unit 160 to be activated. The light projection unit 160 projects the light around the wireless charger 100. And, the light projected around the power receiver 200 from the light projection unit 160 may indicate the charging area of the wireless charger 100 or the charged state of the power receiver 200 in the course of the wireless charging. Therefore, a user is able to recognize an area for enabling the power receiver 200 to be supplied with power by wireless or recognize whether the power receiver 200 enters a state in which the power receiver 200 is able to be supplied with power by wireless, based on the area illuminated by the light projection unit 160.

Figure 3:
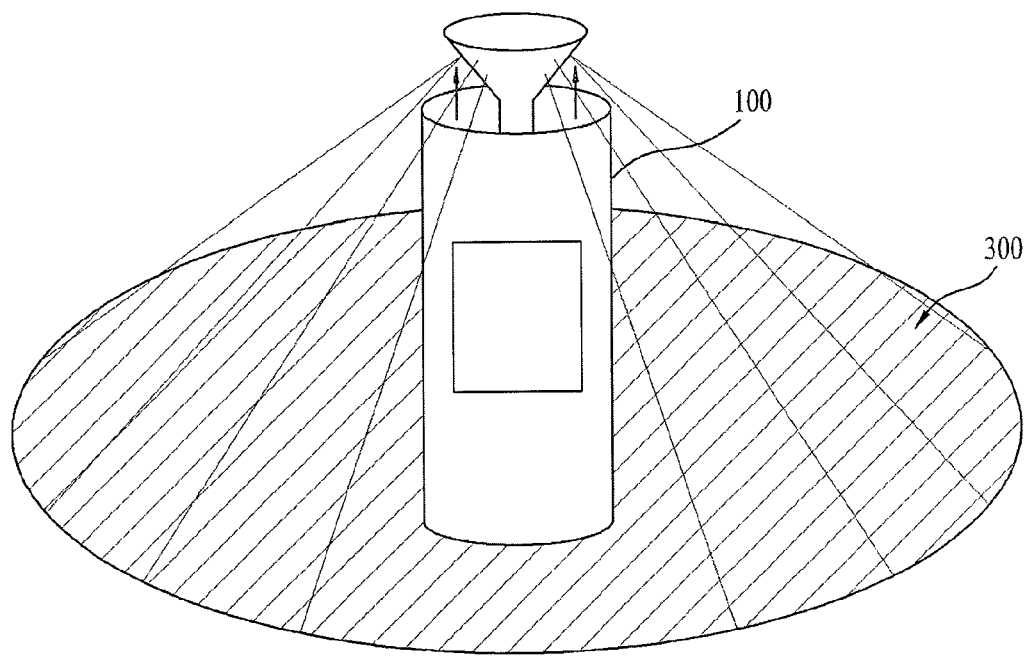
FIG. 3 is a diagram for one example to show that a light projection unit displays a charging area around a wireless charger.

FIG. 3 is a diagram for one example to show that the light projection unit 160 displays a charging area around the wireless charger 100.

Referring to FIG. 3, if a power is applied to the wireless charger 100, the first control unit 170 may control the light projection unit 160 to apply light around the wireless charger 100 by emitting the light. A user is then able to recognize that the power receiver 200 is chargeable within the area illuminated around the wireless charger 100 and is also able to estimate a charging-possible area of the wireless charger 100. In the following description, the charging-possible area, which is indicated by the wireless charger 100 on a projection plane around the wireless charger 100, shall be named a charging cell 300.

In FIG. 3, when the light projection unit 160 indicates the charging cell 300, it may use a direct projection method of directly projecting light on a projection plane, on which the charging cell 300 is formed, or an indirect projection method of indirectly projecting light on the projection plane. According to the projection method, the light projection unit 160 may further include a light emitting unit 162 and a reflective unit 164.

FIG. 4 is a diagram for one example to show that the light projection unit 160 is configured to use direct projection or indirect projection.

FIG. 4 (a) shows one example of applying the direct projection to the light projection unit 160. In case that the direct projection method is applied, the light emitting unit 162 of the light projection unit 160 may directly apply the light to the projection plane around the wireless charger 100 under the control of the first control unit 170. Since the light emitting unit 162 directly applies the light to the projection plane, it is able to create the charging cell 300.

On the other hand, FIG. 4 (b) shows one example of applying the indirect projection to the light projection unit 160. In case that the indirection method is applied, the light emitting unit 162 of the light projection unit 160 may apply the light to the reflective unit 164 under the control of the first control unit 170. The reflective unit 164 applies the incident light from the light emitting unit 162 to the projection plane around the wireless charger 100, thereby creating the charging cell 300. The indirect projection method described with reference to FIG. 4 (b) differs from the direct projection method described with reference to FIG. 4 (a) in creating the charging cell 300 around the wireless charger 100 using the light reflected by the reflective unit 164.

The light emitting unit 162 of the above-described light projection unit 160 may comprise a light emitting device as a laser beam, a light emitting diode (LED), an organic light emitting diode (OLED) and the like. Yet, since the laser beam has light scattering less than that of the LED and the OLED, if the light emitting unit 162 is configured using the LED or the OLED, it may indicate the charging cell 300 more clearly. Moreover, if may be unnecessary to configure the light emitting unit 162 with a single-colored light source. For instance, the light emitting unit 162 may be configured with a group of a plurality of laser beams LED or OLED to emit a plurality of colors. The reflective unit 164 of the light projection unit 160 is configured to reflect the light, which is projected from the light emitting unit 162, to the projection plane and may include a reflector.

The first control unit 170 detects the power receiver 200 situated around or nearby the wireless charger 100 and then saves a charged state information received from the power receiver in the first storage unit 150. The charged state information shall be explained in detail in the description of the power receiver 200 mentioned in the following description.

The above-mentioned wireless charger 100 may further include an overvoltage protection circuit (not shown in the drawing) configured to protect circuitry from overvoltage or a constant voltage circuit (not shown in the drawing) configured to maintain a DC voltage rectified by a rectifier on a prescribed level of voltage. In particular, the overvoltage protection (filter) circuit may be arranged between an AC power line and the first rectifying unit 120 and the constant voltage circuit may be arranged between the first rectifying unit 120 and the inverter unit 130.

In the following description, the power receiver 200 shown in FIG. 2 is explained in detail. Referring to FIG. 2, the power receiver 200 may include a second resonance unit 210, a second rectifying unit 220, a charging management unit 230, a second communication unit 240, a second storage unit 250, a battery 260, a battery fuel gauge 270, a second control unit 280 and the like.

In particular, the second resonance unit 210 of the power receiver 200 may include a second coil 212 configured to be supplied with a power by wireless from the wireless charger 100 while performing a magnetic field communication with the wireless charger 100. Like the first coil 112, the second coil 212 may be implemented with a solid coil having a plurality of coils aggregated therein. As the second coil 212 is implemented to have the formation of the solid coil, a magnetic field generated from the second coil 212 may have omni-directionality (i.e., no directionality). Therefore, the second coil 212 can be provided with the charging power from the wireless charger 100 irrespective of the direction in which the wireless charger 100 is placed.

The second rectifying unit 220 rectifies the AC voltage induced via the second resonance unit 210 into a DC voltage that can be provided to the battery 260. Thereafter, the DC voltage outputted from the second rectifying unit 220 is applied to the charging management unit 230. Subsequently, the charging management unit 230 generates a constant voltage/current to have the battery 260 charged with and then controls the battery 260 to be charged. In particular, the second control unit 280 controls the charging management unit 230 to enter a constant current mode at an initial charging timing point of the battery 260. If the charging of the battery 260 is completed, the second control unit 280 may control the charging management unit 230 to enter a constant voltage mode.

The battery fuel gauge 270 measures a remaining power level of the battery 260. The battery fuel gauge 270 may measure a current or voltage inputted to or outputted from the battery 260 and may also measure a temperature of the battery 260. The second control unit 280 may control the information on the battery 260, which is obtained from the battery fuel gauge 270, to be saved in the second storage unit 250.

The second control unit 280 outputs data including the charged state information of the battery 260 to the second communication unit 250. Hence, the second communication unit 240 modulates the data including the charged state information and then outputs the modulated data to a low frequency coil. The low frequency coil is then able to provide the charged state information of the battery 260 to the wireless charger 100. In this case, the charged state information may include information indicating whether the battery 260 is charged, information indicating a remaining power level of the battery 260, information indicating whether the battery 260 is fully charged, and the like. The control unit 280 may control the second communication unit 240 to provide the charged state information of the battery 260, which is obtained from the battery fuel gauge 270, to the wireless charger 100.

Moreover, based on the remaining power level of the battery 260, a current amount inputted to the battery 260, the temperature of the battery 260 and the like, which are obtained from the battery fuel gauge 270, the control unit 280 may calculate the time remaining until the battery 260 is fully charged. In doing so, the second control unit 280 may create the charged state information that further includes an estimated time taken to fully charge the battery 260.

Referring to FIG. 2, the wireless charger 100 supplies the power by wireless to the power receiver 200 without a wired cable and also guides a location at which the power receiver 200 can be charged. In the following description, the present invention is explained in detail through various embodiments for utilizing the wireless charger 100 and the power receiver 200 shown in FIG. 2.

According to the embodiment mentioned in the following description, for instance, the wireless charger 100 may include a display unit 192 displays an ID and a charged level of the power receiver 200. In this case, the charged level may include a remaining power level of the battery 260 or a power level (i.e., a different between a total level of the battery 260 and a currently remaining power level of the battery 260, etc.) required for fully charging the battery 260. For clarity of the descriptions mentioned in the following, assume that the charged level displayed on the display unit 192 may include the remaining power level of the battery 260.

Yet, the wireless charger 100 including the display unit 192 is exemplarily shown for clarity of the following description only. And, it may be unnecessary for the wireless charger 100 to include the display unit 192.

<First Embodiment>

The first control unit 170 configuring the wireless charger 100 is able to control a color of the charging cell 300 to change depending on a charged state of the power receiver 200. In particular, if the battery 260 of the power receiver 200 starts to be charged, the first control unit 170 may control the color of the charging cell 300 to change depending on a remaining power level of the battery 260 of the power receiver 200, whether the battery 260 is fully charged, and the like. The present embodiment of the present invention is described in detail with reference to the accompanying drawings.

Figure 5:
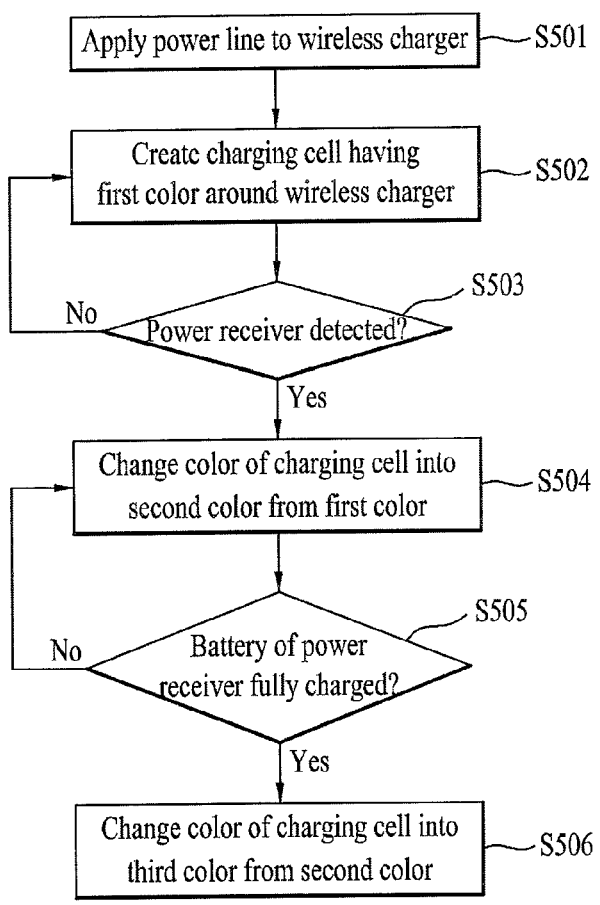
FIG. 5 is a flowchart for an operation of a wireless charger according to one embodiment of the present invention.

FIG. 5 is a flowchart for an operation of a wireless charger according to one embodiment of the present invention.

Referring to FIG. 5, if a power line is applied to the wireless charger 100 [S501], the first control unit 170 may control the light projection unit 160 to create the charging cell 300, which is provided to indicate a charging-possible area of the wireless charger 100, by applying a first color to an area around the wireless charger 100 [S502]. Since how to create the charging cell 300 around the wireless charger 100 is already described with reference to FIG. 3 and FIG. 4, its details shall be omitted from the following description.

If the power receiver 200 capable of being supplied with a power by wireless from the wireless charger 100 is detected from an area around the wireless charger 100 [S503], the first control unit 170 may control the light projection unit 160 to change a color of the charging cell 300 into a second color different from the first color [S504]. A process for changing the color of the charging cell 300 from the first color into the second color shall be described in detail with reference to FIG. 6 as follows.

Figure 6:
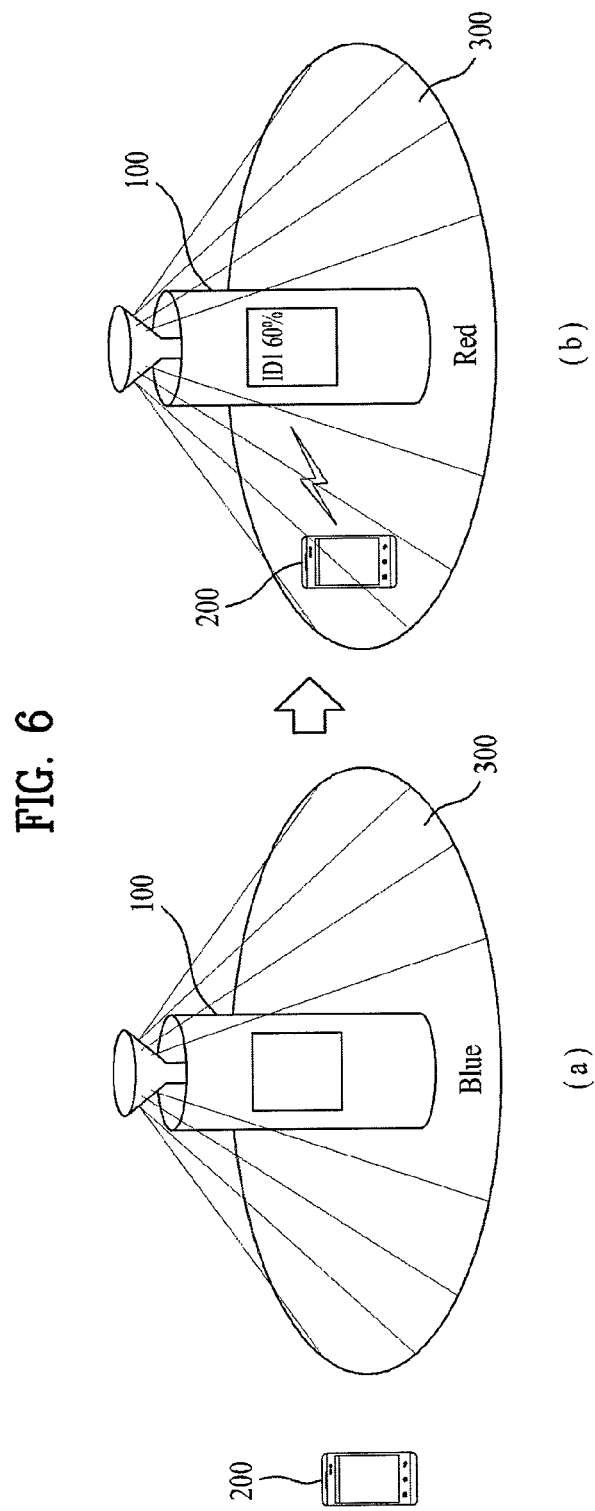
FIG. 6 is a diagram for one example to describe that a color of a charging cell changes when a power receiver starts to be supplied with a charging power by wireless.

FIG. 6 is a diagram for one example to describe that a color of the charging cell 300 changes when the power receiver 200 starts to be supplied with a charging power by wireless.

Referring to FIG. 6 (a), as the power receiver 200 is located outside the charging cell 300, if the charging power is not supplied to the power receiver 200, the first control unit 170 may control the light projection unit 160 to enable the charging cell 300 to be illuminated in a first color (e.g., blue in FIG. 6 (a)). Thereafter, referring to FIG. 6 (b), as the power receiver 200 enters the charging cell 300, if the charging power starts to be supplied to the power receiver 200, the first control unit 170 may control the color of the charging cell 300 to change into a second color (e.g., red in FIG. 6 (b)) different from the first color. In particular, as the charging power is supplied to the power receiver 200, if the power receiver 200 starts to be charged, it may indicate that the charging power is normally being supplied to the power receiver 200 in a manner of changing the color of the charging cell 300.

Referring now to FIG. 5, the first control unit 170 may obtain the charged state information of the power receiver 200 via the first communication unit 140 periodically (or aperiodically). Based on the charged state information obtained from the power receiver 200, if the first control unit 170 determines that the battery 260 of the power receiver 200 is in a fully charged state [S505], the first control unit 170 may control the light projection unit 160 to change the color of the charging cell 300 into a third color different from the second color [S506]. A process for changing the color of the charging cell 300 from the second color into the third color shall be described in detail with reference to FIG. 7 as follows.

Figure 7:
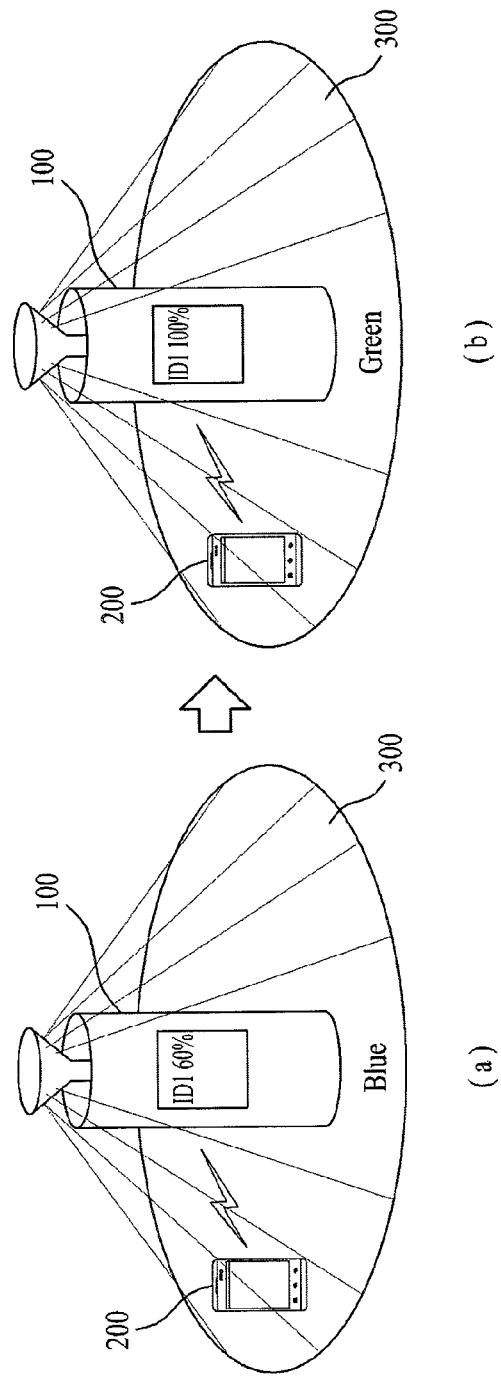
FIG. 7 is a diagram for one example to describe that a color of a charging cell changes depending on whether a battery of a power receiver is fully charged.

FIG. 7 is a diagram for one example to describe that a color of the charging cell 300 changes depending on whether the battery 260 of the power receiver 200 is fully charged.

Referring to FIG. 7 (a), in the early stage, after the power receiver 200 has entered the charging cell 300, the first control unit 170 may control the light projection unit 160 to apply a second color (e.g., red in FIG. 7 (a)) to the charging cell 300. Thereafter, based on the charged state information provided by the power receiver 200, if the first control unit 170 recognizes that the power receiver 200 is fully charged, the first control unit 170 may control the light projection unit 160 to apply a third color (e.g., green in FIG. 7 (b)), which is different from the second color), to the charging cell 300.

In particular, referring to FIG. 5 and FIG. 7, the first control unit 170 controls the color of the charging cell 300 to change depending on whether the battery 260 is fully charged, thereby enabling a user to be informed that the battery 260 of the power receiver 200 is fully charged.

In FIG. 5, a user may move the power receiver 200 out of the charging cell 300 (i.e., a charging-possible area provided by the wireless charger) at any time while the power receiver 200 is being supplied with a charging power. As the power receiver 200 gets out of the charging cell 300 to enter a state in which the power receiver 200 is unable to be supplied with the charging power, the first control unit 170 may control the light projection unit 160 to change the color of the charging cell 300 into the first color again.

Referring to FIG. 5 and FIG. 7, the color of the charging cell 300 changes depending on whether the battery 260 is fully charged, which is just exemplary. For instance, it may control the color of the charging cell 300 to change based on various kinds of factors. For instance, the first control unit 170 may control the light projection unit 160 to change the color of the charging cell 300 depending on a remaining power level of the battery 260. In particular, after the remaining power level of the battery 260 has been checked based on the charged state information received from the power receiver 200, the first control unit 170 may control the light projection unit 160 to apply a color suitable for the checked remaining power level.

For instance, Table 1 shows a color change of the charging cell 300 depending on a remaining power level.

TABLE 1

| Remaining power level of battery 260 | Color of charging cell 300 |
| --- | --- |
| 0~10% | Red |
| 11~20% | Purple |
| 21~30% | Orange |
| 31~40% | Yellow |
| 41~50% | Brown |
| 51~60% | Ivory |
| 61~70% | Sky blue |
| 71~80% | Violet |
| 81~90% | Bluish green |
| 91~100% | Green |

Referring to Table 1, if the remaining power level of the battery 260 is 50%, the first control unit 170 may control the color of the charging cell 300 to change into brown. And, if the remaining power level of the battery 260 is 75%, the first control unit 170 may control the color of the charging cell 300 to change into violet. In particular, the first control unit 170 controls the color of the charging cell 300 to change depending on the remaining power level of the battery 260, thereby facilitating a user to be provided with the information indicating how much the battery 260 is charged with.

Although Table 1 shows that the color of the charging cell 300 changes depending on the remaining power level of the battery 260, it may set the color of the charging cell 300 to change depending on an estimated time taken to fully charge the battery 260 for another example. In particular, the first control unit is able to confirm the estimated time taken to fully charge the battery 260 based on the charged state information received from the power receiver 200 and is then able to control the light projection unit 160 to change the color of the charging cell 300 depending on the estimated time.

For instance, Table 2 shows a color change of the charging cell 300 depending on the estimated time taken to fully charge the battery 260.

TABLE 2

| Estimated time | Color of the charging cell 300 |
|---|---|
| over 03 h | Red |
| 03 h 00 m~02 h 41 m | Purple |
| 02 h 40 m~02 h 21 m | Orange |
| 02 h 20 m~02 h 01 m | Yellow |
| 02 h 00 m~01 h 41 m | brown |
| 01 h 40 m~01 h 21 m | Ivory |
| 01 h 20 m~01 h 01 m | Sky blue |
| 01 h 00 m~00 h 41 m | Violet |
| 00 h 40 m~00 h 21 m | Bluish green |
| 00 h 20 m~00 h 00 m | Green |

Referring to Table 2, if the estimated time taken to fully charge the battery 260 is 2 hours 10 minutes, the first control unit 170 controls the light projection unit 160 to change the color of the charging cell 300 into yellow. And, if the estimated time taken to fully charge the battery 260 is 1 hour 10 minutes, the first control unit 170 controls the light projection unit 160 to change the color of the charging cell 300 into sky blue.

The items and colors exemplarily shown in Table 1 or Table 2 are provided for clarity of the description only, by which the present invention may be non-limited. In particular, Table 1 shows that the color of the charging cell 300 changes by unit of 10%. And, Table 2 shows that the color of the charging cell 300 changed by unit of 20 minutes. Yet, different references or criteria may be applicable. And, it is apparent that various colors other than or in addition to the colors designated in Table 1 or Table 2 are available. Moreover, the present invention may be non-limited by the colors of the charging cell 300 shown in FIG. 6 or FIG. 7.

<Second Embodiment>

The first control unit 170 configuring the wireless charger 100 is able to control the light projection unit 160 to change a color of the charging cell 300 depending on the number of the power receivers 200, each of which is supplied with a power by wireless from the wireless charger 100. In particular, each time the number of the power receivers 200 increases, the first control unit 170 may control the light projection unit 160 to change the color of the charging cell 300. The present embodiment of the present invention is described in detail with reference to the accompanying drawings.

Figure 8:
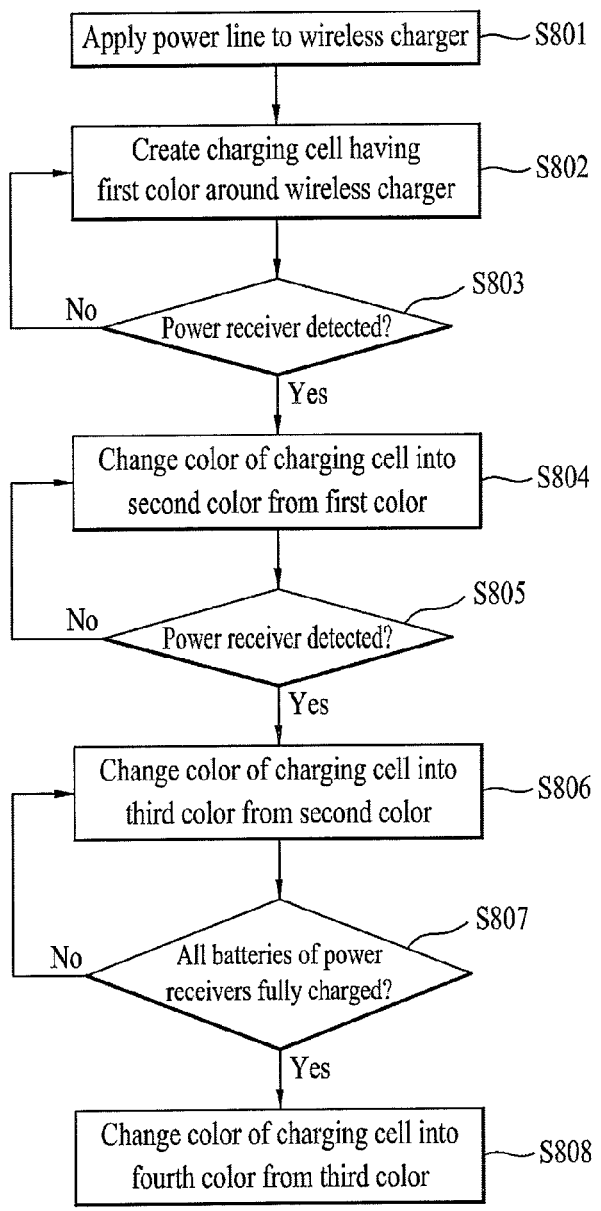
FIG. 8 is a flowchart for an operation of a wireless charger according to one embodiment of the present invention.

FIG. 8 is a flowchart for an operation of a wireless charger 100 according to one embodiment of the present invention.

Referring to FIG. 8, if a power line is applied to the wireless charger 100 [S801], the first control unit 170 may control the light projection unit 160 to create the charging cell 300, which is provided to indicate a charging-possible area of the wireless charger 100, by applying a first color to an area around the wireless charger 100 [S802]. Since how to create the charging cell 300 around the wireless charger 100 is already described with reference to FIG. 3 and FIG. 4, its details shall be omitted from the following description.

If the power receiver 200 capable of being supplied with a power by wireless from the wireless charger 100 is detected from an area around the wireless charger 100 [S803], the first control unit 170 may control the light projection unit 160 to change a color of the charging cell 300 into a second color different from the first color [S804]. A process for changing the color of the charging cell 300 from the first color into the second color is already described with reference to FIG. 6, its details shall be omitted from the following description. While the power receiver 200 is being charged, if another power receiver 200, which is to be supplied with a charging power by wireless from the wireless charger 100, is further detected [S805], the first control unit 170 may control the light projection unit 160 to change the color of the charging cell into a third color different from the second color [S06]. How the first control unit 170 changes the color of the charging cell 300 into the third color from the second color is described in detail with reference to FIG. 9 as follows.

Figure 9:
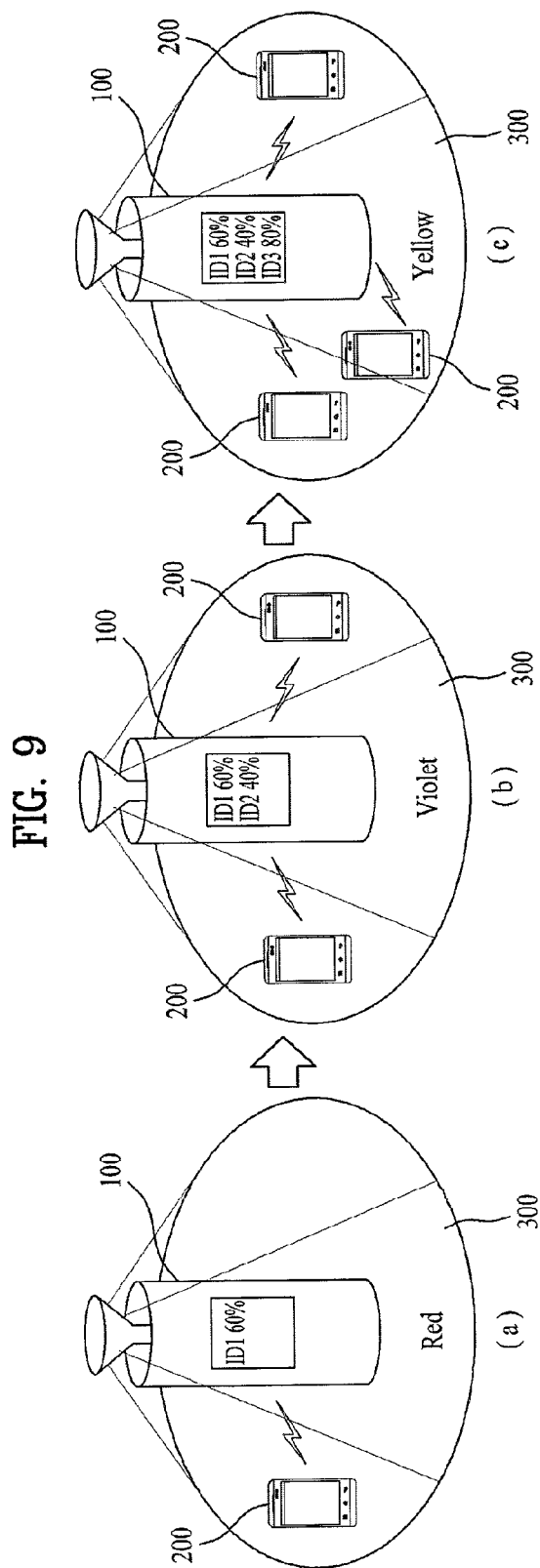
FIG. 9 is a diagram for one example to describe that a color of a charging cell changes depending on the number of power receivers connected to a wireless charger.

FIG. 9 is a diagram for one example to describe that a color of a charging cell 300 changes depending on the number of power receivers 200 connected to a wireless charger.

Referring to FIG. 9 (a), in case that one power receiver 200 is supplied with a power from the wireless charger 100, the first control unit 170 may control the light projection unit 160 to enable the charging cell 300 to be illuminated in a second color (e.g., red in FIG. 9 (a)). Thereafter, referring to FIG. 9 (b), if another power receiver 200 supplied with a power by wireless from the wireless charger 100 is further added, the first control unit 170 may control the color of the charging cell 300 to change into a third color (e.g., violet in FIG. 9 (b)) different from the second color. FIG. 9 shows the case that two power receivers 200 are detected only, by which the present invention may be non-limited. After the color of the charging cell 300 has changed into the third color in response to the detection of the two power receivers 200, if a new power receiver 200 is further detected, the first control unit 170 may control the color of the charging cell 300 to change into a fourth color different from the third color. In particular, if an $n^{th}$ power receiver 200 is detected, the first control unit 170 may control the color of the charging cell 300 to change into $(n+1)^{th}$ color, which is different from $n^{th}$ color, where n is a natural number equal to or greater than 1. For instance, if one more power receiver 200 supplied with a power by wireless from the wireless charger 100 is added in the state shown in FIG. 9 (b), the first control unit 170 may control the light projection unit 160 to change the color of the charging cell 300 into a fourth color (e.g., yellow in FIG. 9 (c)) different from the third color.

Moreover, while 'n' power receivers 200 are being charged by wireless, if 'a' power receivers 200 are further detected at the same time, the first control unit 170 may control the color of the charging cell 300 to change into $[(n+1)+a]^{th}$ color from $(n+1)^{th}$ color, where each of the n and the a is a natural number equal to or greater than 1. For instance, in the situation shown in FIG. 9 (b), if two power receivers 200 supplied with a power by wireless from the wireless charger 100 are further added at the same time, the first control unit 170 may control the light projection unit 160 to change the color of the charging cell 300 into a fifth color from the third color.

In particular, for example shown in FIG. 9, each time the number of the power receivers 200 supplied with the power by wireless from the wireless charger 100 increases, the first control unit 170 may control the light projection unit 160 to change the color of the charging cell 300. By changing the color of the charging cell 300 each time the number of the power receivers 200 increases, a user is able to recognize whether the newly added power receiver 200 is being correctly supplied with the charging power from the wireless charger 100 and may be able to easily determine how many power receivers 200 are being charged by wireless.

If one of the power receivers 200 supplied with the power from the wireless charger 100 gets out of the charging cell, the first control unit 170 may control the color of the charging cell 300 to change from $n^{th}$ color into $(n-1)^{th}$ color.

Referring now to FIG. 8, if all the batteries 260 of a plurality of the power receivers connected to the wireless charger 100 are fully charged, the first control unit 170 may control the light projection unit 160 to further change the color of the charring cell 300 into a fifth color different from the third or fourth color [S807]. In doing so, a user is able to recognize that the batteries 260 of a plurality of the power receivers 200 are fully charged using the color of the charging cell 300 only. When all the batteries 260 of a plurality of the power receivers 200 are fully charged, the color changing of the charging cell 300 shall be described in detail with reference to FIG. 10 as follows.

Figure 10:
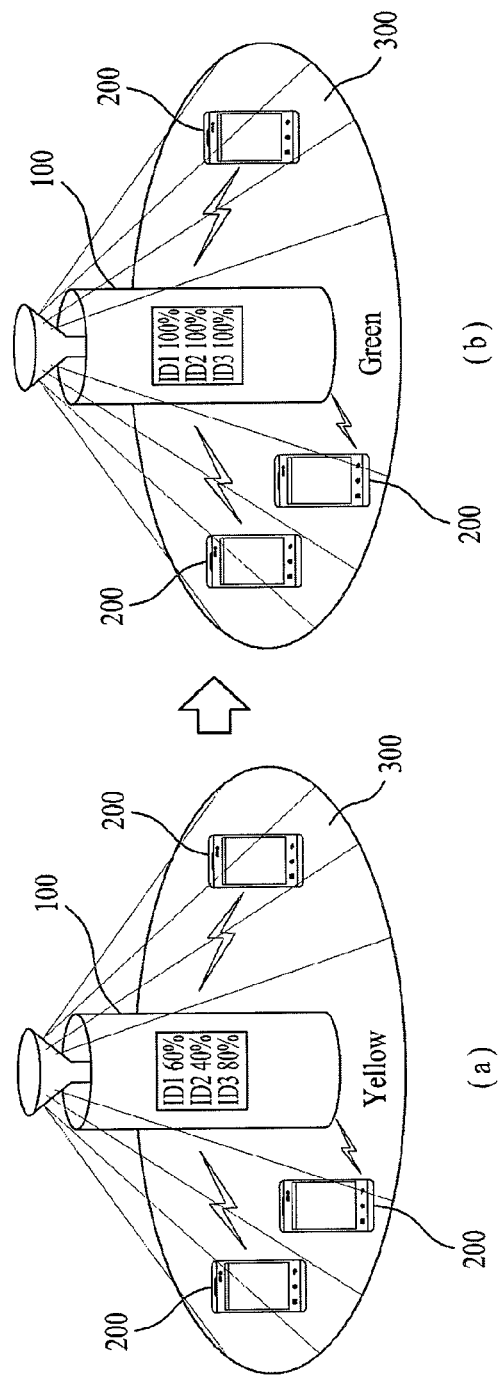
FIG. 10 is a diagram for one example to describe that a colors of a charging cell changes if batteries of a plurality of power receivers are fully charged.

FIG. 10 is a diagram for one example to describe that a color of a charging cell 300 changes if batteries 260 of a plurality of power receivers 200 are fully charged.

Referring to FIG. 10 (a), while 3 power receivers 200 are being charged, the first control unit 170 may control the light projection unit 160 to illuminate the charging cell 300 in a fourth color (e.g., yellow in FIG. 10 (a)). Thereafter, if the batteries 260 of the 3 power receivers are fully charged, referring to FIG. 10 (b), the first control unit 170 may control the light projection unit 160 to illuminate the charging cell 300 in a fifth color (e.g., green in FIG. 10 (b)) different from the fourth color.

Meanwhile, the second embodiment may be available in a manner of being combined with the first embodiment instead of being used independently from the first embodiment. In particular, in case that a single power receiver 200 supplied with a power by wireless from the wireless charger 100 exists, the first embodiment may apply. And, in case that a plurality of power receivers 200 supplied with a power by wireless from the wireless charger 100 exist, the second embodiment may apply.

<Third Embodiment>

According to the first or second embodiment, a color of the whole charging cell 300 changes depending on the charged state of the power receiver 200 or the number of the power receivers 200 having entered the charging cell 300. Yet, it may be unnecessary to change a color of a whole charging cell 300 like the first or second embodiment. Instead, the first control unit 170 may control the light projection unit 160 to just change a color of a part of the charging cell 300, at which the power receiver 200 is located, in accordance with a charged state of the power receiver 200. In this case, the wireless charger 100 may further include a location detecting unit configured to detect a location of the power receiver 200. Embodiments of the present invention are described in detail with reference to the accompanying drawings as follows.

Figure 11:
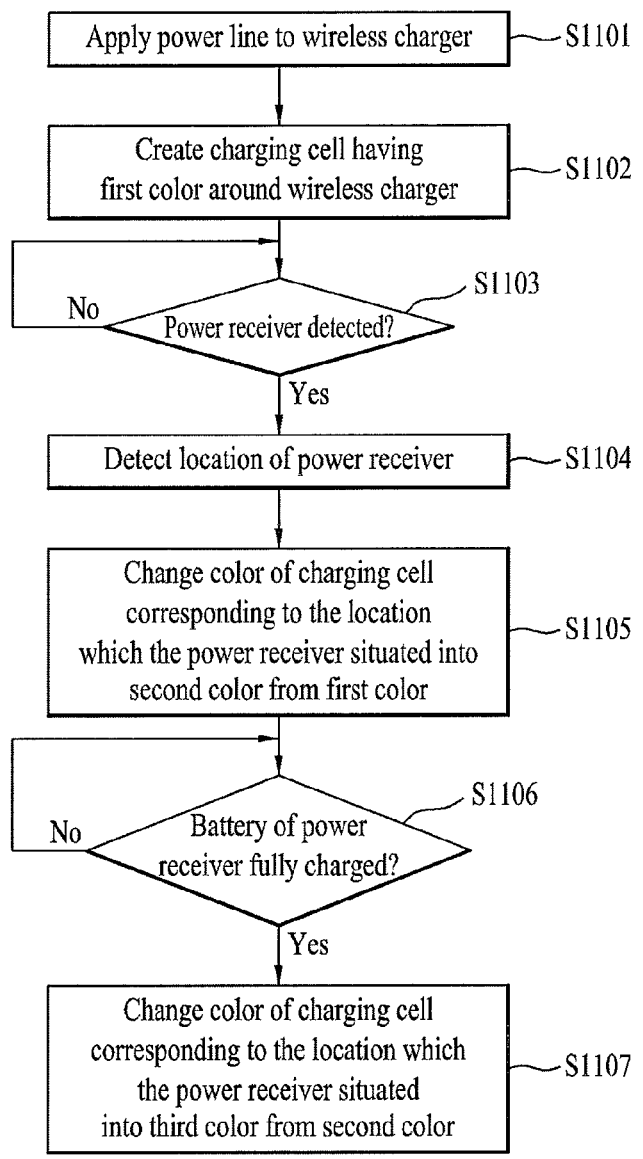
FIG. 11 is a flowchart for an operation of a wireless charger according to one embodiment of the present invention.

FIG. 11 is a flowchart for an operation of a wireless charger 100 according to one embodiment of the present invention.

Referring to FIG. 11, if a power line is applied to the wireless charger 100 [S1101], the first control unit 170 may control the light projection unit 160 to create a charging cell 300, which is provided to indicate a charging-possible area of the wireless charger 100, by applying a first color to an area around the wireless charger 100 [S1102]. Thereafter, if a power receiver 200 capable of being supplied with a power by wireless from the wireless charger 100 is detected from an area around the wireless charger 100 [S1103], the first control unit 170 may be able to detect a location, at which the power receiver 200 is located, via the location detecting unit [S1104]. If the location of the power receiver 200 is detected from the charging cell 300, the first control unit 170 may control the light projection unit 160 to change a color of the location, at which the power receiver is located 200, into a second color different from the first color [S1105].

A process for changing the color of the location, at which the power receiver 200 is located, from the first color into the second color shall be described in detail with reference to FIG. 12 as follows.

Figure 12:
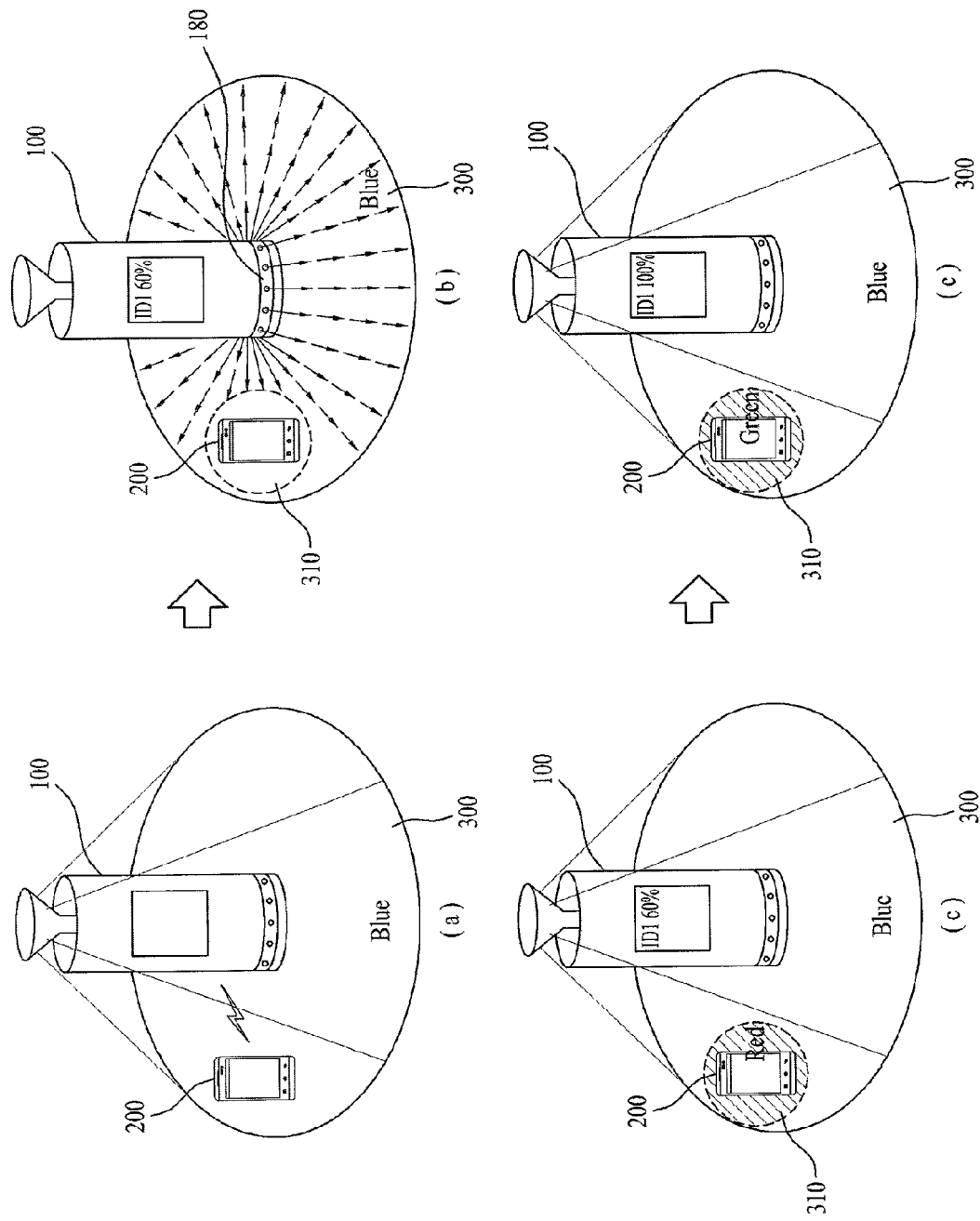
FIG. 12 is a diagram for one example to describe that a color of a partial area of a charging cell changes from a first color into a second color.

FIG. 12 is a diagram for one example to describe that a color of a partial area of a charging cell 300 changes from a first color into a second color.

Referring to FIG. 12 (a), if the power receiver 200 enters the charging cell 300, the first control unit 170 may detect the power receiver 200 via a magnetic field communication with the power receiver 200. If the power receiver 200 is detected, referring to FIG. 12 (b), the first control unit 170 may obtain a location 310, at which the power receiver 200 is located within the charging cell 300, via the location detecting unit 180. Once the power receiver located location 310 is obtained, referring to FIG. 12 (c), the first control unit 170 may control the light projection unit 160 to change the color of the power receiver located location 310 into a second color (e.g., red in FIG. 12 (c)) from a first color (e.g., blue in FIG. 12 (a) and FIG. 12 (b)).

Thereafter, if the battery 260 of the power receiver 200 is fully charged [S1106], the first control unit 170 may control the light projection unit 160 to change the color of the power receiver located location 310 into a third color different from the second color. Once the battery 260 of the power receiver 200 is fully charged, referring to FIG. 12 (d), the first control unit 170 is able to change the color of the power receiver located location 310 into the third color (e.g., green in FIG. 12 (d)) from the second color.

According to the embodiment mentioned in the above description, the location detecting unit may include a location sensor configured to detect a location of the power receiver 200. In particular, the location sensor may include at least one of a laser sensor, a magnetic sensor, a geomagnetic sensor, a proximity sensor and the like.

In FIG. 11, it may be unnecessary to execute the step S1103 and the step S1104 in order of the above description. Alternatively, it may be able to execute the step S1103 behind the step S1104. Alternatively, it may be able to execute the step S1104 in the middle of the step S1103.

Moreover, it is a matter of course that the applicable items mentioned in the first or second embodiment are applicable to the third embodiment. For instance, the process for adjusting the color of the power receiver located location in accordance with the remaining power level of the battery 260 or the estimated time taken to fully charge the battery 260 may be substituted with the process for adjusting the color of the charging cell 300 in accordance with the remaining power level of the battery 260 or the estimated time taken to fully charge the battery 260 [Table 1 or Table 2 of the first embodiment].

The third embodiment may be used together with the first embodiment and the second embodiment. Each of the first embodiment and the second embodiment relates to changing the color of the whole charging cell 300 and the third embodiment relates to changing the color of a portion of the charging cell 300, which may be regarded as unavailable at the same time. Yet, a single wireless charger 100 may control the color of the whole charging cell 300 or the color of one portion of the charging cell 300 to be adjusted in accordance with user settings.

<Fourth Embodiment>

According to the third embodiment, the single power receiver 200 enters the charging cell 300 of the wireless charger 100. In the following description of the present invention, when a plurality of power receivers 200 located within a charging cell 300, operations of the power receivers 200 are explained.

Figure 13:
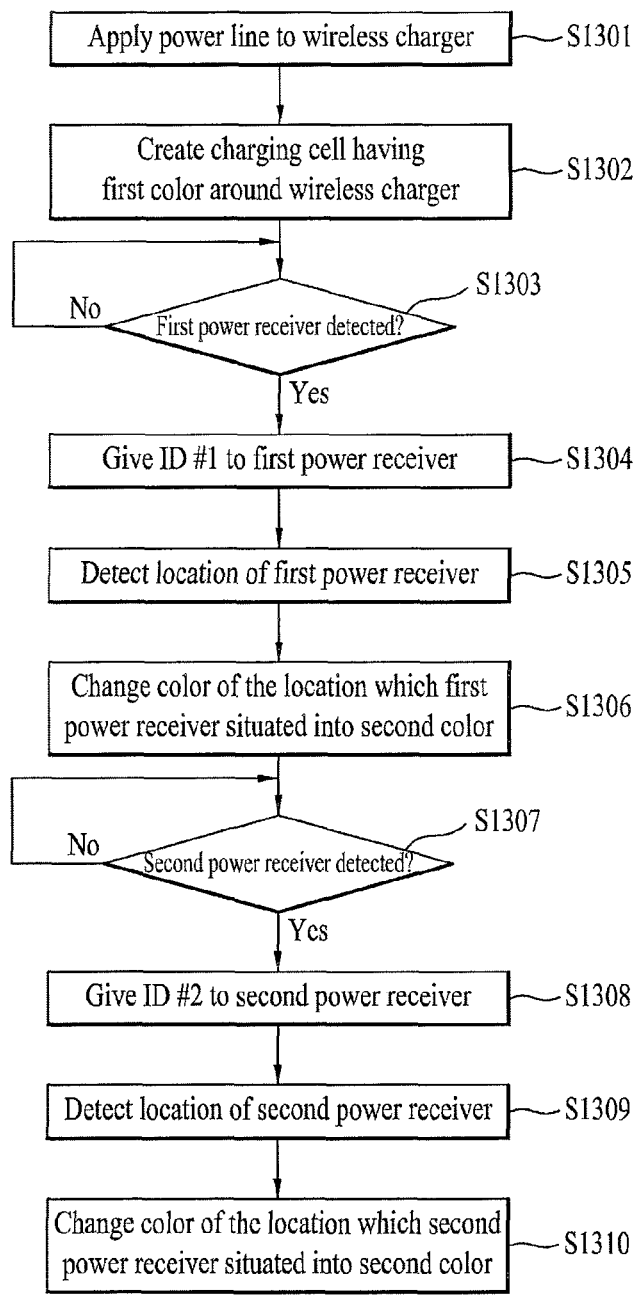
FIG. 13 is a flowchart for an operation of a wireless charger according to one embodiment of the present invention.

FIG. 13 is a flowchart for an operation of a wireless charger according to one embodiment of the present invention.

Referring to FIG. 13, if a power line is applied to the wireless charger 100 [S1301], the first control unit 170 may control the light projection unit 160 to create a charging cell 300, which is provided to indicate a charging-possible area of the wireless charger 100, by applying a first color to an area around the wireless charger 100 [S1302]. Thereafter, if a power receiver 200 capable of being supplied with a power by wireless from the wireless charger 100 is detected from an area around the wireless charger 100 [S1303], the first control unit 170 gives an ID #1 to a first power receiver 200 via a communication with the corresponding power receiver 200 [S1304]. Thereafter, the first control unit 170 may detect a location of the first power receiver 200 situated in the charging cell 300 via the location detecting unit [S1305]. If the first power receiver 200 is detected, the first control unit 170 may control the light projection unit 160 to change a color of the location, at which the first power receiver 200 is situated, into a second color different from the first color [S1306]. While the first power receiver 200 is being charged, if a second power receiver 200 is detected [S1307], the first control unit 170 gives an ID #2 to the second power receiver 200 [S1308]. Thereafter, the first control unit 170 may detect a location of the second power receiver 200 situated in the charging cell 300 via the location detecting unit [S1309]. If the location of the second power receiver 200 is detected, the first control unit 170 may control the light projection unit 160 to change the color of the location, at which the second power receiver 200 is situated, into a second color different from the first color [S1310]. Subsequently, the first control unit 170 performs magnetic field communications with the power receiver 200 of the ID #1 and the power receiver 200 of the ID #2, thereby adjusting the colors of the charging cells 300 corresponding to the first power receiver situated location and the second power receiver situated location, respectively. In particular, if the first power receiver 200 is fully charged, the first control unit 170 controls the color of the first location, at which the first power receiver 200 is situated, to change into a third color. If the second power receiver 200 is fully charged, the first control unit 170 controls the color of the second location, at which the second power receiver 200 is situated, to change into a third color.

Figure 14:
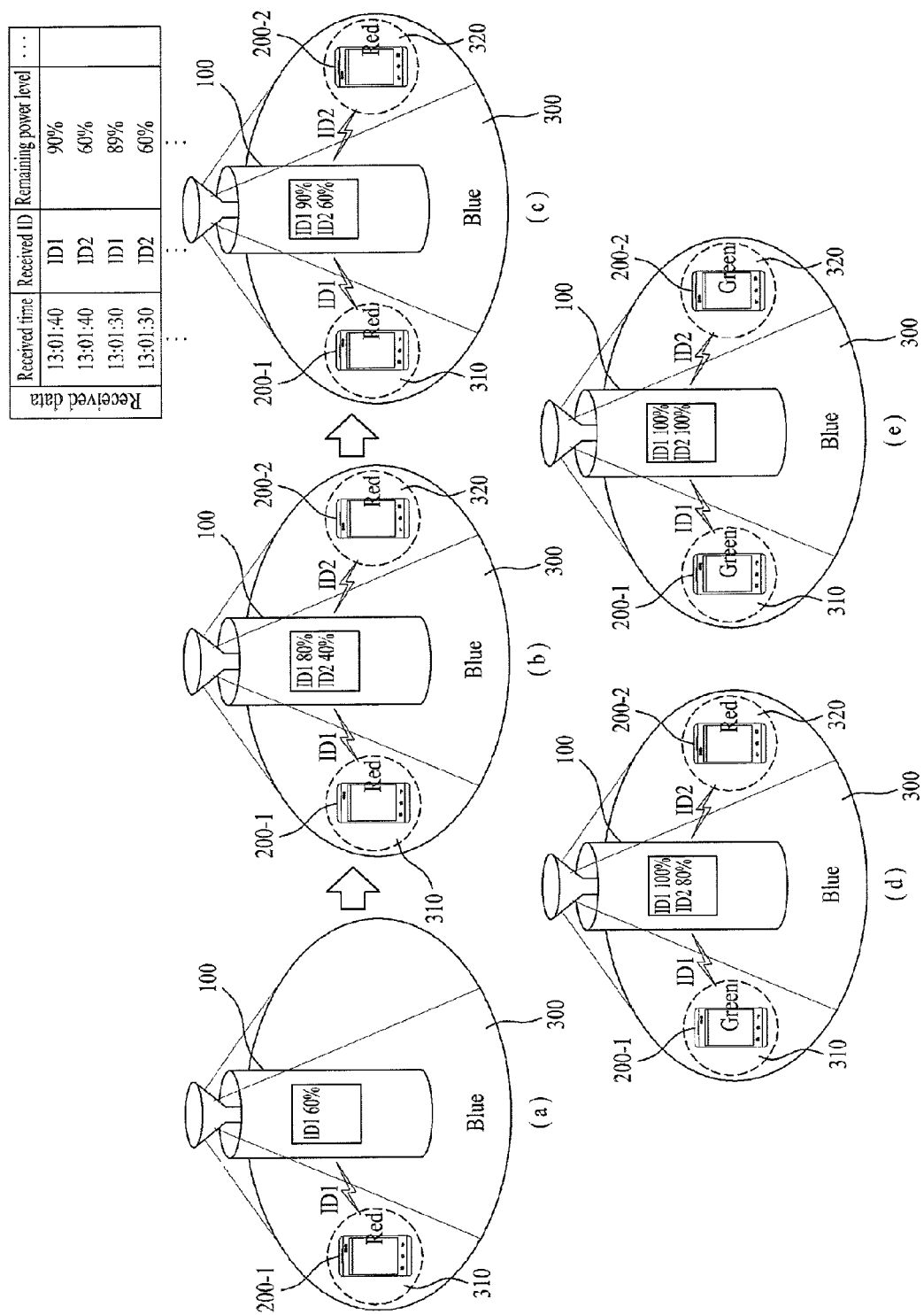
FIG. 14 is a diagram for one example to describe that a plurality of areas are adjusted into different colors depending on locations of power receivers within a charging cell.

FIG. 14 is a diagram for one example to describe that a plurality of areas are adjusted into different colors depending on locations of power receivers 200 within a charging cell 300.

Referring to FIG. 14 (a), if a first power receiver 200-1 is detected, the first control unit 170 gives an ID #1 to the first power receiver 200-1. The first control unit 170 may be then able to change the color of a first location 310, at which the first power receiver 200-1 is situated within the charging cell 300, into a second color from a first color. Thereafter, if a second power receiver 200-2 is further detected, referring to FIG. 14 (b), the first control unit 170 gives an ID #2 to the second power receiver 200-2 and is then able to adjust a color of a second location 320, at which the second power receiver 200-2 is situated within the charging cell 300, into the second color from the first color. Thereafter, referring to FIG. 4 (c), data received as a result of a magnetic field communication with the first power receiver 200-1 or the second power receiver 200-2 may have the ID #1 or the ID #2. Since the data received with the ID #1 is the charged state information related to the first power receiver 200-1, it may be used in adjusting the color of the first location 310. Since the data received with the ID #2 is the charged state information related to the second power receiver 200-2, it may be used in adjusting the color of the second location 320. In particular, as ID #n indicates a charged state information of an $n^{th}$ power receiver, the first control unit 170 may adjust a color of an $n^{th}$ location based on the charged state information having the ID #n. For instance, if the data received with the ID #1 indicates that the battery 260 is fully charged, referring to FIG. 4 (d), the first control unit 170 may control the light projection unit 160 to change the color of the first location into a third color different from the second color. For another instance, if the data received with the ID #2 indicates that the battery 260 is fully charged, referring to FIG. 4 (e), the first control unit 170 may control the light projection unit 160 to change the color of the second location into the third color different from the second color.

Therefore, according to the fourth embodiment, the first control unit 170 assigns a communication ID for communication in order of entering the charging cell 300 and determines a location of the power receiver 200 within the charging cell 300, thereby controlling a different illumination to be applied to each location at which the corresponding power receiver 200 is located.

Although FIG. 13 shows one example of a case that two power receivers 200 are detected by the wireless charger 100, it is a matter of course that the embodiment shown in FIG. 13 is applicable to a case that at least two power receivers 200 are detected.

As mentioned in the foregoing description of the third embodiment, it may be unnecessary for the power receiver detecting steps S1303, S1304, S1306 and S1307 and the location detecting steps S1305 and S1309 to be executed in order shown in FIG. 13. And, it is a matter of course that the power receiver detecting steps and the location detecting steps are executed at the same time or in reverse order.

Moreover, it is a matter of course that the present embodiment may be available together with the third embodiment. In particular, in case that a single power receiver 200 exists in the charging cell 300, the third embodiment is applicable. In case that a plurality of the power receivers 200 exist in the charging cell 300, the fourth embodiment is applicable. In applying the fourth embodiment, Table 1 and Table 2 of the first embodiment is also applicable, as mentioned in the foregoing description of the third embodiment.

<Fifth Embodiment>

According to the first or fourth embodiment, the charging cell 300 for indicating a wireless charging possible area is displayed on an area around the wireless charger 100 for example. Yet, it may be unnecessary for the charging cell 300 to be displayed on the area around the wireless charger 100. Although the charging cell 300 is not displayed, if an illumination is applied to a prescribed area nearby the wireless charger 100, it may recognize whether the power receiver 200 is in a wireless charged state. In the following description, a process for displaying a subcell 400 for indicating a charged state of the power receiver 200 without displaying the charging cell 300 is explained with reference to the accompanying drawings.

Figure 15:
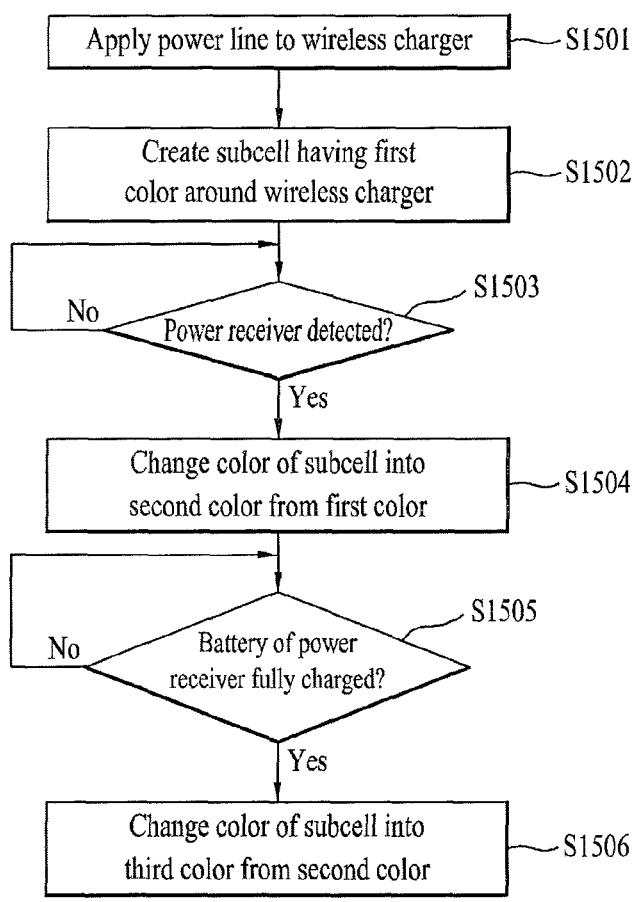
FIG. 15 is a flowchart for an operation of a wireless charger according to one embodiment of the present invention.

FIG. 15 is a flowchart for an operation of a wireless charger 100 according to one embodiment of the present invention.

Referring to FIG. 15, if a power line is applied to the wireless charger 100 [S1501], the first control unit 170 may control the light projection unit 160 to create a subcell 400 having a first color to display a charged state of the power receiver 200 on a prescribed area around the wireless charger 100 [S1502]. In this case, since the subcell 400 is not used to indicate a charging possible area of the wireless charger 100 unlike the charging cell 300, it may be unnecessary for the subcell 400 to be created to enclose the wireless charger 100 like the charging cell 300. Yet, if the power receiver 200 is situated in the area corresponding to the subcell 400, a user is able to recognize that a wireless charging will occur via the subcell 400. In particular, the subcell 400 plays a role in displaying the charged state of the power receiver 200 and a role in displaying information on a partial area for charging the power receiver 200 by wireless. Thereafter, if the power receiver 200 capable of being supplied with a power by wireless from the wireless charger 100 is detected from the area around the wireless charger 100 [S1503], the first control unit 170 may control the light projection unit 160 to change a color of the subcell 400 into a second color different from the first color [S1504].

Figure 16:
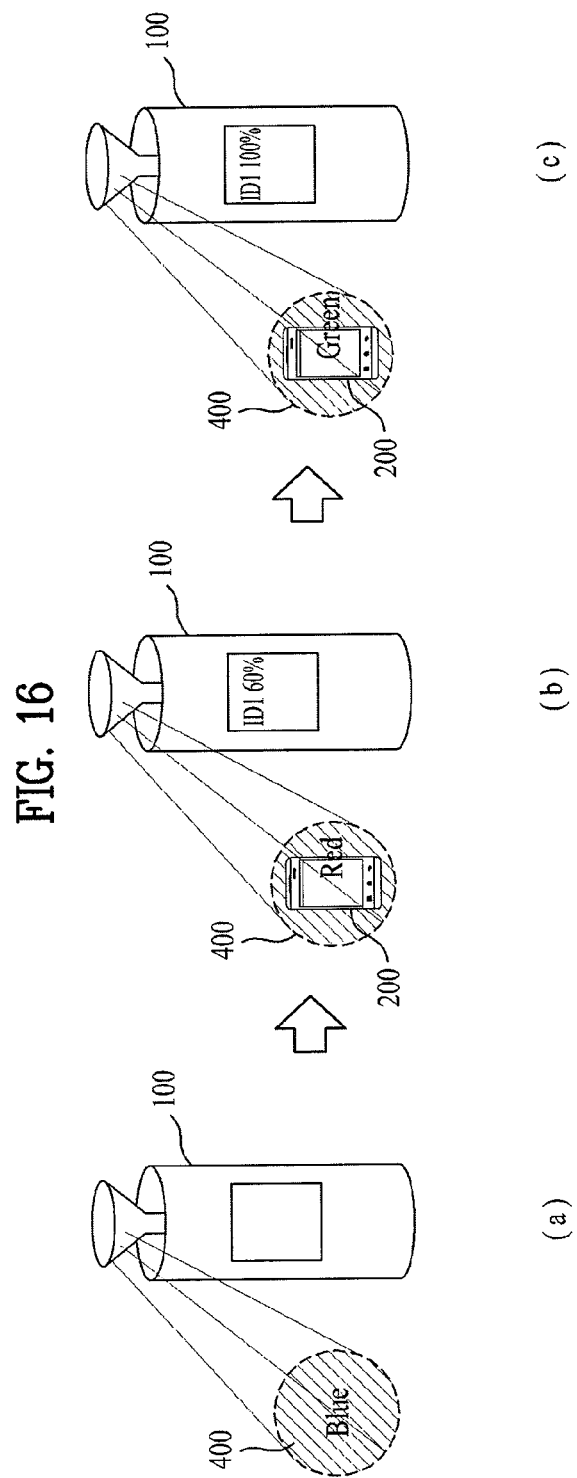
FIG. 16 is a diagram for one example to describe that a color of a subcell changes from a first color into a second color.

FIG. 16 is a diagram for one example to describe that a color of a subcell 400 changes from a first color into a second color.

Referring to FIG. 16 (*a*), the first control unit 170 may create the subcell 400, which is to display a charged state of the power receiver 200, at a prescribed location around the wireless charger 100. In FIG. 16 (*a*), the subcell 400 has a first color (e.g., blue, etc.) for example. Thereafter, if the wireless charger 100 detects the power receiver 200, referring to FIG. 16 (*b*), the first control unit 170 may be able to adjust a color of the subcell 400 into a second color (e.g., red in FIG. 16 (*b*)) different from the first color. A user is able to determine whether the power receiver 200 enters a charging possible area of the wireless charger 100 via a color change of the subcell 400 and is also able to determine whether a wireless charging power is normally supplied to the power receiver 200.

Although FIG. 16 shows one example that the power receiver 200 is placed on the subcell 400, which is just exemplary for clarity of the description, it may be unnecessary for the power receiver 200 to be placed on the subcell 400. In particular, it may not be necessary for the power receiver 200 to be charged by wireless only if the power receiver 200 is placed on the subcell 400. Yet, if the power receiver 200 is placed on the subcell 400, a user may obtain the charged state of the power receiver 200 more intuitively.

Subsequently, based on the charged state information received from the power receiver 200, if the charging of the power receiver 200 is completed [S1505], referring to FIG. 16 (*c*), the first control unit 170 may be able to control the light projection unit 160 to change the color of the subcell 400 into a third color (e.g., green in FIG. 16 (*c*)) different from the second color [S1506].

In particular, according to the present embodiment, it may determine whether the power receiver 200 is located within the subcell 400 without displaying the charging cell 300 like the first to fourth embodiments.

In FIG. 15, after the subcell 400 has been created [S1502], the power receiver 200 capable of being supplied with the power by wireless from the wireless charger 100 is detected [S1503]. Yet, it may be unnecessary perform the present invention in order shown in the drawing. For instance, the present invention may be performed in order reverse to that shown in the drawing. In particular, after the power receiver 200 has been detected, the first control unit 170 may control the light projection unit 160 to create the subcell 400 for displaying the state information of the detected power receiver 200. In doing so, the step S1504 of adjusting the color of the subcell 400 into the second color from the first color is omitted and the subcell 400 can be adjusted to have the second color in direct.

Meanwhile, it is a matter of course that the applicable items of the first embodiment and the second embodiment are applicable to the fifth embodiment. For instance, the step of adjusting the color of the charging cell 300 in accordance with the remaining power level of the battery 260 or the estimated time taken to fully charge the battery 260, as shown in Table 1 or Table 2 of the first embodiment, may replace the step of adjusting the color of the subcell 400 in accordance with the remaining power level of the battery 260 or the estimated time taken to fully charge the battery 260 in the fifth embodiment.

The fifth embodiment may be available together with at least one of the first to fourth embodiments. Each of the first to fourth embodiments relates to displaying the charging cell 300 and then changing the color of at least one portion of the charging cell 300 and the fifth embodiment relates to displaying the subcell 400 different from the charging cell 300, which may be regarded as unavailable at the same time. Yet, it may be able to determine whether to display the charging cell 300 or the subcell 400 in accordance with user settings.

Moreover, if the location detecting unit 180 of the third or fourth embodiment is further included, the first control unit 170 may control the light projection unit 160 to have the subcell 400 situated at the place at which the power receiver 200 is situated.

<Sixth Embodiment>

According to the fifth embodiment, the single subcell 400 is displayed. Yet, it may be unnecessary for the single subcell 400 to be displayed only. Namely, in order to display charged states of a plurality of power receivers 200, the first control unit 170 may control a plurality of subcells 400 to be displayed on an area around the wireless charger 100. In the following description, a process for displaying a plurality of subcells 400 around the wireless charger 100 is explained in detail with reference to the accompanying drawings.

Figure 17:
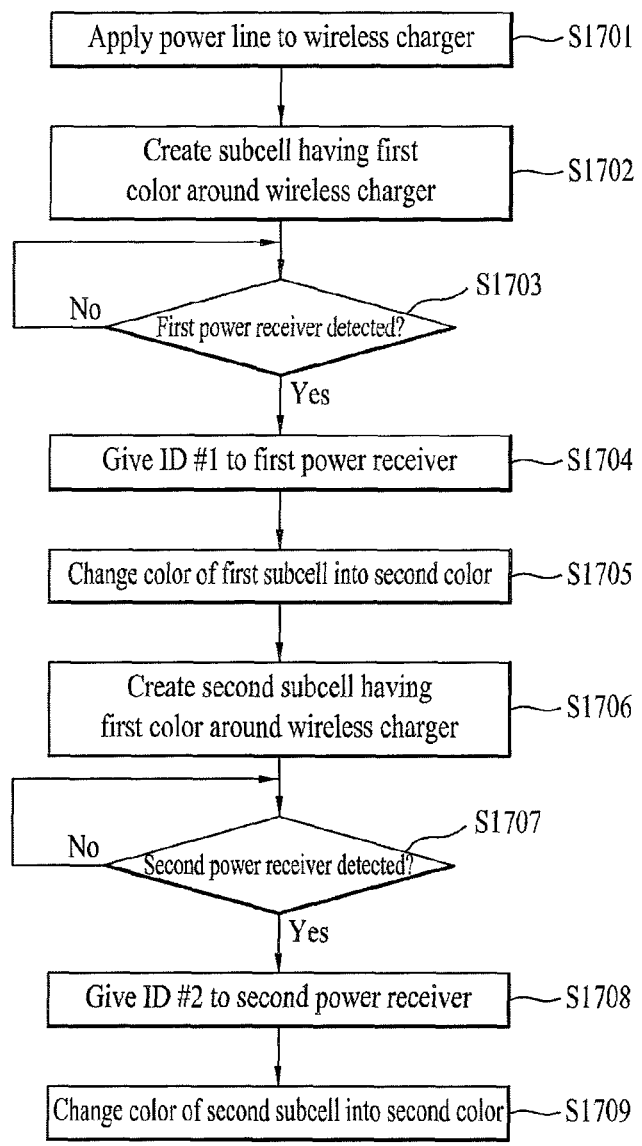
FIG. 17 is a flowchart for an operation of a wireless charger according to one embodiment of the present invention.

FIG. 17 is a flowchart for an operation of a wireless charger 100 according to one embodiment of the present invention.

Referring to FIG. 17, if a power line is applied to the wireless charger 100 [S1701], the first control unit 170 may control the light projection unit 160 to create a first subcell 400 having a first color to display a charged state of a first power receiver 200 on a prescribed region around the wireless charger 100 [S1702]. If the first power receiver 200 capable of being supplied with a power by wireless from the wireless charger 100 is detected from the area around the wireless charger 100 [S1703], the first control unit 170 gives an ID #1 to the first power receiver 200 [S1704] and may control the light projection unit 160 to change the color of the first subcell 400 into a second color different from the first color [S1705]. If the color of the first subcell 400 is changed, the first control unit 170 may control the light projection unit 160 to display a second subcell 400 having the first color on a location different from the former location on which the first subcell 400 is projected [S1706]. Thereafter, if a second power receiver 200 capable of being supplied with the power by wireless from the wireless charger 100 is detected from the area around the wireless charger 100 [S1707], the first control unit 170 gives an ID #2 to the second power receiver 200 [S1708] and may be able to control the light projection unit 160 to change the color of the second subcell 400 into the second color different from the first color [S1709].

FIG. 18 is a diagram for one example to describe a process for creating a plurality of subcells 400 and a process for changing a color of each of the subcells from a first color into a second color.

Referring to FIG. 18 (*a*) and FIG. 18 (*b*), if a first power receiver 200-1 a is detected, the first control unit 170 may control the light projection unit 160 to adjust a color (e.g., blue in FIG. 18) of a first subcell 410 into a second color (e.g., red in FIG. 18). Simultaneously, the first control unit 170 may further control the light projection unit 160 to create a second subcell 420 having the first color at a location different from that of the first subcell 410.

While the first power receiver 200-1 is being charged by wireless, if a second power receiver 200-2 is further detected, referring to FIG. 18 (c), the first control unit 170 may control the light projection unit 160 to further create a third subcell 430 having the first color while adjusting the color of the second subcell 430 into the second color. In particular, in the example shown in FIG. 18, the first subcell 410 may be understood as indicating a charged state of the first power receiver 200-1. And, the second subcell 420 may be understood as indicating a charged state of the second power receiver 200-2. Moreover, an $n^{th}$ subcell may be understood as indicating a charged state of an $n^{th}$ power receiver.

Besides, since a charged state information received from the $n^{th}$ power receiver has an ID #n, the first control unit 170 may adjust the color of the $n^{th}$ subcell based on the charged state information of the ID #n. For instance, if the second power receiver 200-2 is fully charged in the state shown in FIG. 18 (c), referring to FIG. 18 (d), the first control unit 170 may control the light projection unit 160 to change the color of the second subcell 420 into a third color different from the second color.

FIG. 18 shows that the first power receiver 200-1 and the second power receiver 200-2 are placed on the first subcell 410 and the second subcell 420, respectively. As mentioned in the foregoing description with reference to FIG. 16, this is just one example for clarity of the description. In particular, it may not be necessary for the power receiver 200 to be charged by wireless only if placed on the subcell 400. Yet, while a plurality of the power receivers 200 are being charged, as shown in FIG. 18, if the power receivers 200 are situated at different subcells, respectively, a user may recognize the charged states of the power receivers 200 intuitively.

FIG. 18 shows one example that the color of the subcell 400 is changed if the charging of the power receiver 200 is completed. Yet, as mentioned in the foregoing description of the fifth embodiment, it is a matter of course that the applicable items of the first embodiment and the second embodiment are applicable to the present embodiment. For instance, the step of adjusting the color of the charging cell 300 in accordance with the remaining power level of the battery 260 or the estimated time taken to fully charge the battery 260, as shown in Table 1 or Table 2 of the first embodiment, may replace the step of adjusting the color of the subcell 400 in accordance with the remaining power level of the battery 260 or the estimated time taken to fully charge the battery 260 in the sixth embodiment.

Although FIG. 17 shows one example of detecting two power receivers 200 to describe the present embodiment, it is apparent that the present invention is applicable to two or more power receivers 700.

The present embodiment may be available in a manner of being combined with the fifth embodiment. For instance, in case that a single power receiver 200 is connected to the wireless charger 100, the fifth embodiment may be applicable. In case that a plurality of power receivers 200 are connected to the wireless charger 100, the sixth embodiment may be applicable.

<Seventh Embodiment>

The seventh embodiment is derived from the fifth embodiment and the sixth embodiment. And, the present embodiment may be applicable together with both of the fifth embodiment and the sixth embodiment. In the following description, the present embodiment is explained in detail with reverence to FIG. 19.

FIG. 19 is a diagram for one example to describe that a subcell moves to a location from which a wireless charger is detected.

First of all, the subcell 400 for displaying a charged state of the power receiver 200 is explained in the descriptions of the fifth embodiment and the sixth embodiment. Regarding the subcell 400, referring to FIG. 16 or FIG. 18, the power receiver 200 is placed on the subcell 400. Yet, as mentioned in the foregoing descriptions with reference to FIG. 16 and FIG. 18, it may be unnecessary for the power receiver 200 to be charged by wireless only if the power receiver 200 is placed on the subcell 400. For instance, referring to FIG. 19 (a), in case that the power receiver 200 is located output of the subcell 400, it is a matter of course that a charging power can be supplied to the power receiver 200 by wireless.

Yet, if the power receiver 200 is located out of the subcell 400, the first control unit 170 may control the light projection unit 160 to move the subcell 400 to a location at which the power receiver 200 is placed. For instance, if the power receiver 200 capable of being supplied with a power by wireless from the wireless charger 100 is detected in FIG. 19 (a), referring to FIG. 19 (b), the first control unit 170 may detect the power receiver placed location using the location detecting unit 180. Once the power receiver placed location is detected, referring to FIG. 19 (c), the first control unit 170 may control the color of the subcell 400 from a first color (e.g., blue in FIG. 19 (b)) into a second color (e.g., red in FIG. 19 (c)) and control the location of the subcell 400 to the power receiver placed location.

If the subcell 400 is situated on the power receiver 200, it is advantageous in providing a user with a charged state of each power receiver 200 effectively in an environment in which a plurality of the power receivers 200 are being charged.

<Eighth Embodiment>

The eighth embodiment is derived from the fifth to seventh embodiments. And, the eighth embodiment may be applicable together with the fifth to seventh embodiments simultaneously. In the description with reference to FIG. 15 or FIG. 17, after the subcell has been created in the area around the wireless charger [S1502, S1702], if the power receiver is detected, the control unit changes the color of the subcell. Yet, it may not be necessary for the subcell to be created before the power receiver is detected. This example is described in detail with reference to FIG. 20 as follows.

FIG. 20 is a diagram for one example to describe that a subcell is created after a wireless charger has been detected.

Referring to FIG. 20 (a), if a power receiver capable of being supplied with a power by wireless is not detected from an area around a wireless charger, a control unit may control any subcell not to be displayed on an area around the wireless charger. Thereafter, if a power receiver capable of being supplied with a power by wireless is detected from the area around the wireless charger [FIG. 20 (b)], the control unit may control a light projection unit to display a subcell on an area around the wireless charger [FIG. 20 (c)]. In this case, a user recognizes that the subcell is displayed on the area around the wireless charger, thereby recognizing that the power is supplied to the power receiver by wireless. In doing so, referring to FIG. 20 (c), it is a matter of course that the control unit is able to control the subcell to be displayed on a location at which the power receiver detected via a location detecting unit is placed.

As mentioned in the foregoing description of the present example, after the power receiver has been detected, the control unit may control the subcell to be created on the area around the wireless charger. In particular, in the example shown in FIG. 15, the step S1502 may be executed after the step S1503. In case that the step S1502 and the step S1503 are switched to each other, since the user is able to recognize that the wireless charging is performed on the power receiver owing to the displayed subcell, it may skip the step S1504.

Moreover, in the example shown in FIG. 17, it is a matter of course that the step S1702 and the step S1706 may be executed after the step S1704 and the step S1708, respectively. Like FIG. 15, since a user is able to recognize that the wireless charging is being performed on the power receiver by checking the subcell displayed on the area around the wireless charger, it may be able to skip the step S1705 and the step S1709.

<Ninth Embodiment>

The wireless charger 100 according to the present invention may further include the display unit 192 configured to display a charged state of the power receiver 200. Based on the charged state information received from the power receiver 200, the first control unit 170 may output the charged state of the power receiver 200 to the display unit 192.

Figure 21:
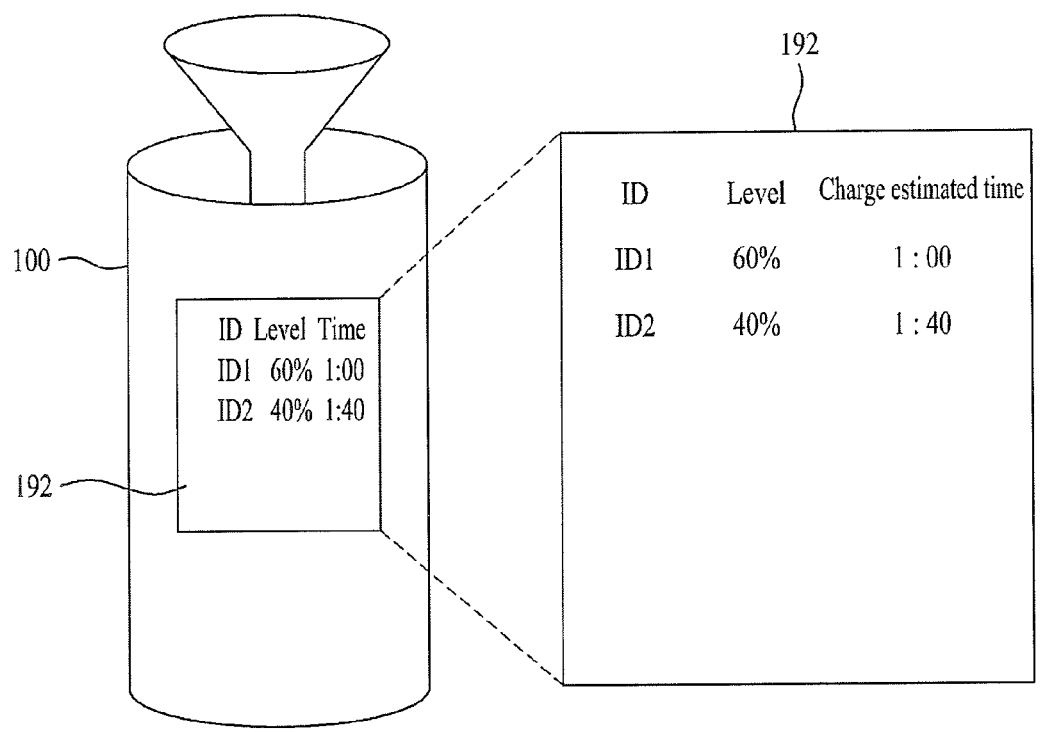
FIG. 21 is a diagram for one example to describe a case that a charged state of a power receiver is displayed via a display unit of a wireless charger.

FIG. 21 is a diagram for one example to describe a case that a charged state of a power receiver 200 is displayed via a display unit 192 of a wireless charger 100.

Referring to FIG. 20, the first control unit 170 may control a charged state of the power receiver 200 in process of a wireless charging to be displayed via the display unit 192. FIG. 21 shows one example that an ID of the power receiver 200 in the course of the wireless charging, a charged level of the battery 260, an estimated time taken to fully charge the battery 260 and the like are displayed. In this case, the charged level of the battery 260 can be construed as a remaining power level of the battery 260 or a remaining power level required for fully charging the battery 260 in a current state. Besides the items shown in FIG. 21, it is a matter of course that more items related to the charged state of the power receiver can be displayed via the display unit 192. On the other hand, it may be unnecessary for the items shown in FIG. 21 to be entirely outputted via the display unit 192. Instead, items less than those shown in FIG. 21 may be outputted via the display unit 192.

The ID given to the power receiver 200 in FIG. 21 is temporarily given by the wireless charger 100 for the magnetic field communication with the power receiver 200. In case that the power receiver 200 performs a communication with the wireless charger 100, the ID may be used to identify each power receiver 200. Simultaneously, the ID given to the power receiver 200 may be utilized to indicate an order for the power receiver 200 to enter the charging cell 300.

It is a matter of course that the present embodiment is available in a manner of being combined with the first to eighth embodiments mentioned in the foregoing description. In particular, the first control unit 170 displays the charged state of the power receiver 200 using the light projection unit 160 and is also able to display the charged state of the power receiver 200 via the display unit 192, in the first to eighth embodiments.

<Tenth Embodiment>

The wireless charger 100 according to the present invention may further include a projector module 194 substituted for or used together with the display unit 192 of the ninth embodiment. In particular, the first control unit 170 may control the projector module 194 to project a charged state of the power receiver 200 on a projection plane nearby the wireless charger 100 based on the charged state information received from the power receiver 200.

Figure 22:
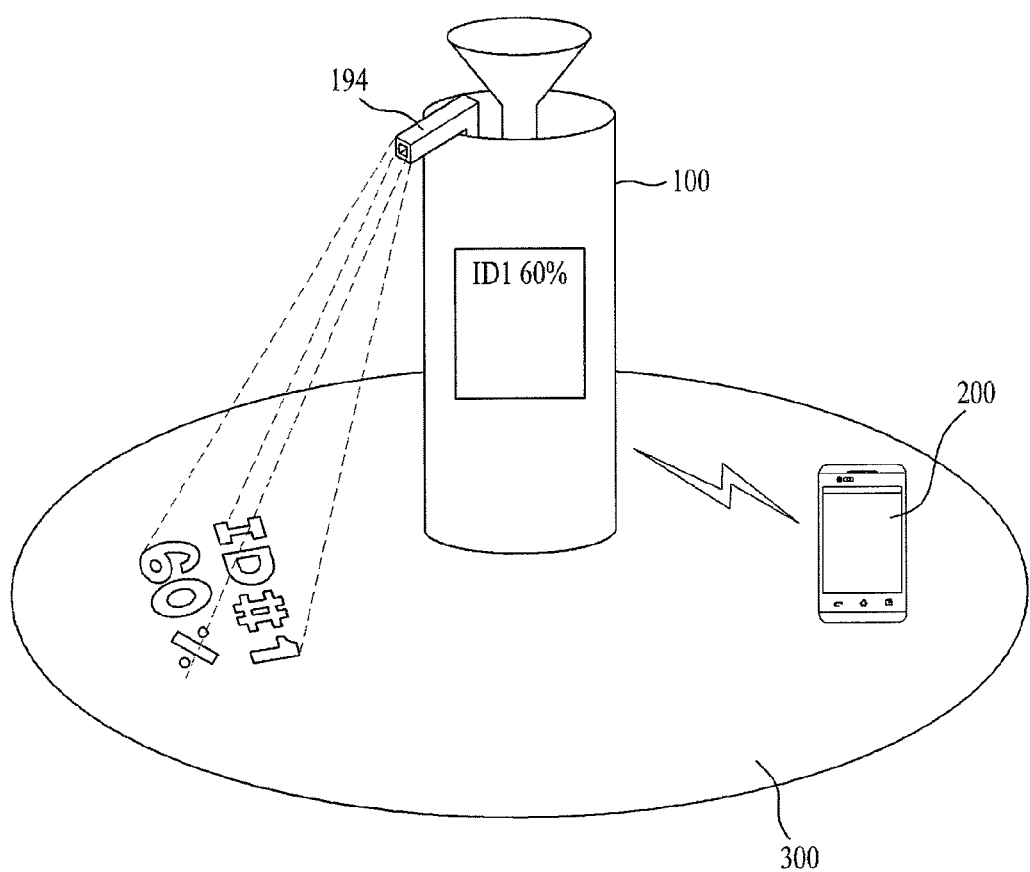
FIG. 22 is a diagram for one example to describe that a charged state of a power receiver is projected onto a projection plane around a wireless charger.

FIG. 22 is a diagram for one example to describe that a charged state of a power receiver 200 is projected onto a projection plane nearby a wireless charger 100.

Referring to FIG. 22, the first control unit 170 may control the projector module 194 to project an ID of the power receiver 200 and a remaining power level of the battery 260 on the projection plane. In case that a plurality of power receivers 200 are supplied with power by wireless, it is a matter of course that the ID and remaining power level of each of the power receivers 200 can be displayed.

Although FIG. 22 shows one example that the projection plane of the projector module 194 is formed within the charging cell 300, the corresponding design of the projection plane of the projector module 194 can be variously modified in accordance with an installation angle of the projector module 194.

Moreover, it may not be necessary for the information shown in FIG. 22 to be projected via the projector module 194 only. In particular, information more or less than that shown in FIG. 22 can be displayed.

Moreover, the projector module 194 may be configured to adopt the direct projection of directly projecting light on the projection plane or the indirect projection of indirectly projecting light on the projection plane using the reflective unit 164, as shown in FIG. 4.

<Eleventh Embodiment>

The power receiver 200 supplied with power by wireless from the wireless charger 100 may further include an alarm unit. In case that the power receiver 200 is separated from the wireless charger 100 irrespective of user's intention, the alarm unit plays a role in informing the user that the power receiver 200 has been separated from the wireless charger 100. For instance, the wireless charging of the power receiver 200 may be interrupted irrespective of user's intention if the power receiver 200 slips to get distant from the wireless charger 100 due to an inclining plane having the power receiver 200 placed thereon, a location of the wireless charger 100 is charged, one power receiver 200 is pushed away from the charging cell 300 by another power receiver 200 entering the charging cell 300, or the like.

If so, the power receiver 200 determines whether to get separated from the wireless charger 100 irrespective of user's intention. If it is clear that the separation is not intended by the user, the user can be informed that the power receiver 200 is separated out of the charging range of the wireless charger 100 via the alarm unit.

In order to determine whether to get separated from the wireless charger 100 irrespective of user's intention, the power receiver 200 may further include a user input unit or a sensor unit. In this case, the user input unit is configured to receive a user input and the sensor unit is configured to detect a motion of the power receiver 200. In particular, in order to detect the motion of the power receiver 200, the sensor unit may include at least one of an acceleration sensor, a gravity sensor, a gyro sensor and the like.

When the wireless charging is interrupted until the battery 260 is fully charged, if one of the following conditions is met, the second control unit 280 may determine that the power receiver 200 has been separated from the charging cell 300 irrespective of user's intention.

i) Case that a user input is not applied via the user input unit for prescribed duration while the wireless charging of the battery 260 is interrupted.

ii) Case that the motion of the power receiver 200 is not detected for prescribed duration while the wireless charging of the battery 260 is interrupted.

iii) Case that both of the case i) and the case ii) are met.

If one of the above-enumerated cases occurs, the second control unit 280 may be able to determine that the power receiver 200 has been separated from the charging cell 300 irrespective of user's intention. If the power receiver 200 is unintentionally separated from the wireless charger, the second control unit 280 activates the alarm unit to inform the user that the power receiver 200 has been separated from the wireless charger 100.

In this case, the alarm unit may be implemented to have one of various configurations. For instance, the alarm unit may include an audio output module configured to generate a warning sound or a vibration motor configured to vibrate the power receiver 200. Alternatively, the alarm unit may be configured to include a display unit configured to output a warning message. In case that the alarm unit includes the display unit, the display unit 192 may include a touchscreen capable of receiving a user input as well as outputting a warning message.

Since the audio output module, the vibration motor and the touchscreen are well-known devices, their technical details shall be omitted from this specification.

According to the first to sixth embodiments, it is a matter of course that the light projection unit 160 can be configured to adopt the direct or indirect projection system shown in FIG. 4. Moreover, according to the first to sixth embodiments, the color of each of the charging cell 300 and the subcell 400 includes the first color, the second color, the third color, the fourth color and the like for example. In this case, the first to fourth colors may differ from one another, which may not be always necessary. It is necessary for the $n^{th}$ color to differ from the $(n-1)^{th}$ color only. And, it may not be necessary for the $n^{th}$ color to differ from the $(n-2)^{th}$ color, the $(n-3)^{th}$ color, ... the $(n-(n-1))^{th}$ color. For instance, the fourth color needs to differ from the third color only but may not need to differ from the same color of the first or second color. This may be construed as the same for the appended claims of the present invention.

Accordingly, the present invention provides the following effects and/or advantages.

First of all, the present invention displays a charging possible area of a wireless charger configured to supply a charging power by wireless, thereby enabling a location for placing a power receiver to be accurately determined to charge a battery of the power receiver.

Secondly, the present invention changes a color of a charging possible area, thereby informing a user whether a power receiver is correctly being charged.

Effects and/or advantages obtainable from the present invention are non-limited the above mentioned effect. And, other unmentioned effects can be clearly understood from the following description by those having ordinary skill in the technical field to which the present invention pertains.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wireless charger comprising:
   a power supply unit configured to wirelessly supply a power to a power receiver located in a charging area within a predetermined distance;
   a light reflection unit configured to reflect a light on a ground to inform the charging area around the wireless charger;
   a light projection unit configured to project a light toward the light reflection unit; and
   a control unit configured to:
   control the light projection unit to project the light in a first color toward the light reflection unit such that the light reflection unit reflects the light into a first spot around the wireless charger;
   change a color of the light which is reflected into the first spot from the first color to a second color when a first power receiver is detected in the first spot; and
   control the light projection unit to further project the light in the first color toward the light reflection unit such that the light reflection unit reflects the light into a second spot around the wireless charger in response to the first power receiver being detected in the first spot.

2. The wireless charger of claim 1, further comprising a communication unit configured to receive charging status information, indicating the charging status of the power receiver, from the power receiver,
   wherein the charging status information comprises at least one of identifier of the power receiver or remaining power level of the power receiver.

3. The wireless charger of claim 1, wherein if a second power receiver is detected in the second spot, the control unit is further configured to change the color of the light reflected into the second spot from the first color to the second color.

4. The wireless charger of claim 3, wherein the control unit is configured to:
   adjust the color of the light reflected into the first spot in accordance with an estimated time taken to fully charge a battery of the first power receiver, and
   adjust the color of the light reflected into the second spot in accordance with a remaining power level of the second power receiver.

5. The wireless charger of claim 1, wherein if the first power receiver is fully charged, the control unit is configured to change the color of the light reflected into the first spot from the second color to a third color.

6. The wireless charger of claim 1, further comprising a location detecting unit configured to detect a location at which the power receiver is situated.

7. The wireless charger of claim 1, wherein the control unit is configured to adjust the color of the light reflected into the first spot in accordance with an estimated time taken to fully charge a battery of the first power receiver.

8. The wireless charger of claim 1, further comprising a display unit configured to display the charging status of the power receiver.

9. The wireless charger of claim 1, further comprising a projector module configured to project the charging status of the power receiver on the area around the wireless charger.

10. The wireless charger of claim 1, wherein if the power receiver in the charging area gets out from the charging area before the battery is fully charged, the control unit is configured to output an alarm.

11. A method of controlling a wireless charger, the method comprising:
   projecting a light toward a light reflection unit such that the light reflection unit reflects the light in a first color into a first spot around the wireless charger;
   detecting a power receiver located in the first spot;
   changing a color of the light reflected into the first spot from the first color to a second color; and
   further projecting the light in the first color toward the light reflection unit such that the light reflection unit reflects the light in the first color into a second spot around the wireless charger in response to the power receiver being detected in the first spot.

* * * * *